US008790169B2

(12) United States Patent
Saunders

(10) Patent No.: US 8,790,169 B2
(45) Date of Patent: Jul. 29, 2014

(54) GAMING SYSTEM, GAMING DEVICE, AND METHOD FOR PROVIDING A CASCADING SYMBOLS GAME WITH WILD SYMBOLS USABLE FOR A DESIGNATED QUANTITY OF SYMBOL GENERATIONS

(75) Inventor: Brian F. Saunders, Sunnyvale, CA (US)

(73) Assignee: IGT, Las Vegas, NV (US)

( * ) Notice: Subject to any disclaimer, the term of this patent is extended or adjusted under 35 U.S.C. 154(b) by 1487 days.

(21) Appl. No.: 12/178,429

(22) Filed: Jul. 23, 2008

(65) Prior Publication Data

US 2010/0022297 A1 Jan. 28, 2010

(51) Int. Cl.

*A63F 13/00* (2014.01)
*G07F 17/32* (2006.01)
*G07F 17/34* (2006.01)

(52) U.S. Cl.

CPC ........ *G07F 17/3265* (2013.01); *G07F 17/3267* (2013.01); *G07F 17/34* (2013.01)
USPC .............................................................. 463/2

(58) Field of Classification Search

CPC .. G07F 17/34; G07F 17/3265; G07F 17/3267
USPC ...................................... 463/1, 16–21, 42, 25
See application file for complete search history.

(56) References Cited

U.S. PATENT DOCUMENTS 1,978,395 A 10/1934 Groetchen
3,420,525 A 1/1969 Waders
3,642,287 A 2/1972 Lally et al.
3,735,987 A 5/1973 Ohki
4,099,722 A 7/1978 Rodesch et al.
4,198,052 A 4/1980 Gauselmann
4,200,291 A 4/1980 Hooker (Continued)

FOREIGN PATENT DOCUMENTS

AU 710015 B2 9/1997
AU 722969 6/1998

(Continued)

OTHER PUBLICATIONS

Brokopp, John, "A Study in Slot Machine Research and Development," published at www.casinocitytimes.com on Nov. 30, 2005.

(Continued)

*Primary Examiner* — David L Lewis
*Assistant Examiner* — Robert Mosser
(74) *Attorney, Agent, or Firm* — Neal, Gerber & Eisenberg LLP

(57) ABSTRACT

A plurality of columns each having a plurality of symbol positions are displayed. A gaming system generates and displays one of a plurality of symbols in each symbol position. At least one of the plurality of symbols is a designated symbol with an indicated quantity. The indicated quantity indicates whether the designated symbol is active or inactive. For each winning symbol combination containing at least one designated symbol, the indicated quantity associated with any designated symbol in the winning symbol combination is decremented and any non-designated symbols are removed from the display. Any designated symbols with an associated numeral of zero are inactive and are removed from each winning symbol combination. Any remaining symbols are shifted in a predetermined direction. For each empty symbol position, the gaming system generates and displays a new symbol and repeats the above steps until no winning symbol combinations remain.

42 Claims, 12 Drawing Sheets

(56) References Cited

U.S. PATENT DOCUMENTS 4,326,351 A 4/1982 Heywood et al.
4,357,567 A 11/1982 Rock
4,636,951 A 1/1987 Harlick
4,695,053 A 9/1987 Vazquez, Jr. et al.
4,790,537 A 12/1988 Smyth et al.
4,826,169 A 5/1989 Bessho et al.
4,874,173 A 10/1989 Kishishita
5,152,529 A 10/1992 Okada
5,205,555 A 4/1993 Hamano
RE34,244 E 5/1993 Hagiwara
5,308,065 A 5/1994 Bridgeman et al.
5,332,228 A 7/1994 Schultz
5,364,100 A 11/1994 Ludlow et al.
5,395,111 A 3/1995 Inoue
5,423,539 A 6/1995 Nagao
5,431,408 A 7/1995 Adams
5,449,173 A 9/1995 Thomas et al.
5,564,700 A 10/1996 Celona
5,584,764 A 12/1996 Inoue
5,624,119 A 4/1997 Leake
5,664,998 A 9/1997 Seelig et al.
5,704,835 A 1/1998 Dietz
5,720,662 A 2/1998 Holmes et al.
5,752,881 A 5/1998 Inoue
5,769,716 A 6/1998 Saffari et al.
5,772,506 A 6/1998 Marks et al.
5,807,172 A 9/1998 Piechowiak
5,813,911 A 9/1998 Margolin
5,823,873 A 10/1998 Moody
5,833,536 A 11/1998 Davids et al.
5,833,537 A 11/1998 Barrie
5,882,260 A 3/1999 Marks et al.
5,951,397 A 9/1999 Dickinson
5,980,384 A 11/1999 Barrie
5,984,782 A 11/1999 Innoue
5,997,400 A 12/1999 Seelig et al.
5,997,401 A 12/1999 Crawford
6,033,307 A 3/2000 Vancura
6,056,642 A 5/2000 Bennett
6,059,289 A 5/2000 Vancura
6,086,066 A 7/2000 Takeuchi et al.
6,089,976 A 7/2000 Schneider et al.
6,089,977 A 7/2000 Bennett
6,117,013 A 9/2000 Eiba
6,120,031 A 9/2000 Adams
6,120,376 A 9/2000 Cherry
6,120,377 A 9/2000 McGinnis et al.
6,139,124 A 10/2000 Kling
6,142,875 A 11/2000 Kodachi et al.
6,159,095 A 12/2000 Frohm et al.
6,159,096 A 12/2000 Yoseloff
6,174,235 B1 1/2001 Walker et al.
6,190,254 B1 2/2001 Bennett
6,203,009 B1 3/2001 Sines et al.
6,220,959 B1 4/2001 Holmes, Jr. et al.
6,224,484 B1 5/2001 Okuda et al.
6,227,971 B1 5/2001 Weiss
6,241,607 B1 6/2001 Payne et al.
6,251,013 B1 6/2001 Bennett
6,254,481 B1 7/2001 Jaffe
6,270,411 B1 8/2001 Gura et al.
6,270,412 B1 8/2001 Crawford et al.
6,290,600 B1 9/2001 Glasson
6,299,165 B1 10/2001 Nagano
6,299,170 B1 10/2001 Yoseloff
6,302,429 B1 10/2001 Friedrich
6,305,686 B1 10/2001 Perrie et al.
6,311,976 B1 11/2001 Yoseloff et al.
6,315,289 B1 11/2001 Sakamoto et al.
6,315,660 B1 11/2001 DeMar et al.
6,315,663 B1 11/2001 Sakamoto
6,318,721 B1 11/2001 Randall et al.
6,319,124 B1 11/2001 Baerlocher et al.
6,322,078 B1 11/2001 Adams
6,347,996 B1 2/2002 Gilmore et al.
6,358,144 B1 3/2002 Kaddlic et al.
6,394,902 B1 5/2002 Glavich et al.
6,398,644 B1 6/2002 Perrie et al.
6,409,602 B1 6/2002 Wilshire et al.
6,413,161 B1 7/2002 Baerlocher et al.
6,413,162 B1 7/2002 Baerlocher et al.
6,419,579 B1 7/2002 Bennett
6,439,993 B1 8/2002 O'Halloran
6,464,581 B1 10/2002 Yoseloff et al.
6,481,713 B2 11/2002 Perrie et al.
6,494,454 B2 12/2002 Adams
6,517,432 B1 2/2003 Jaffe
6,575,830 B2 6/2003 Baerlocher et al.
6,585,591 B1 7/2003 Baerlocher et al.
6,589,114 B2 7/2003 Rose
6,604,740 B1 8/2003 Singer et al.
6,616,142 B2 9/2003 Adams
6,632,140 B2 10/2003 Berman et al.
6,634,945 B2 10/2003 Glavich et al.
6,641,477 B1 11/2003 Dietz
6,643,943 B2 11/2003 Dall'Aglio et al.
6,659,864 B2 12/2003 McGahn et al.
6,663,489 B2 * 12/2003 Baerlocher .................... 463/20
6,666,767 B1 12/2003 Dayan
6,676,512 B2 1/2004 Fong et al.
6,695,696 B1 2/2004 Kaminkow
6,702,671 B2 3/2004 Tarantino
6,712,693 B1 3/2004 Hettinger
6,733,386 B2 5/2004 Cuddy et al.
6,780,109 B2 8/2004 Kaminkow
6,802,775 B2 10/2004 Baerlocher et al.
6,805,349 B2 10/2004 Baerlocher et al.
6,832,957 B2 12/2004 Falconer
6,837,788 B2 1/2005 Cannon
6,855,054 B2 2/2005 White et al.
6,866,583 B2 3/2005 Glavich et al.
6,875,106 B2 4/2005 Weiss et al.
6,896,617 B2 5/2005 Daly
6,905,406 B2 6/2005 Kaminkow et al.
6,910,962 B2 6/2005 Marks et al.
6,913,533 B2 7/2005 Cuddy et al.
6,921,335 B2 7/2005 Rodgers et al.
6,942,571 B1 9/2005 McAllister et al.
6,960,133 B1 11/2005 Marks et al.
6,971,955 B2 12/2005 Baerlocher et al.
6,979,263 B2 12/2005 Baerlocher et al.
6,986,710 B2 1/2006 Baerlocher et al.
6,991,538 B2 1/2006 Cannon
6,997,804 B2 2/2006 Berman
7,048,275 B2 5/2006 Adams
7,052,395 B2 5/2006 Glavich et al.
7,056,213 B2 6/2006 Ching et al.
7,070,502 B1 7/2006 Bussick et al.
7,074,127 B2 7/2006 Cuddy et al.
7,077,745 B2 7/2006 Gomez et al.
7,090,580 B2 8/2006 Rodgers et al.
7,094,148 B2 8/2006 Baerlocher et al.
7,104,886 B2 9/2006 Baerlocher et al.
7,108,602 B2 9/2006 Daly
7,137,888 B2 11/2006 Glavich et al.
7,144,322 B2 12/2006 Gomez et al.
7,153,205 B2 12/2006 Baerlocher
7,160,186 B2 1/2007 Cuddy et al.
7,169,042 B2 1/2007 Muir et al.
7,195,559 B2 3/2007 Gilmore et al.
7,226,359 B2 6/2007 Bussick et al.
7,236,113 B1 6/2007 Wang
7,252,591 B2 8/2007 Van Asdale
7,252,592 B2 8/2007 Rodgers et al.
7,294,058 B1 11/2007 Slomiany et al.
7,331,862 B2 2/2008 Rodgers et al.
7,331,866 B2 2/2008 Rodgers et al.
7,357,713 B2 4/2008 Marks et al.
7,371,169 B2 5/2008 Baerlocher
7,371,170 B2 5/2008 Cregan et al.
7,396,279 B2 7/2008 Berman et al.
7,399,225 B2 7/2008 Kaminkow
7,442,123 B2 10/2008 Brill et al.
2002/0010017 A1 1/2002 Bennett

(56) References Cited

U.S. PATENT DOCUMENTS

| | | | |
|---|---|---|---|
| 2002/0068623 | A1 | 6/2002 | Gauselmann |
| 2002/0077165 | A1 | 6/2002 | Bansemer et al. |
| 2003/0045345 | A1 | 3/2003 | Berman |
| 2003/0054874 | A1 | 3/2003 | Kaminkow |
| 2003/0057645 | A1 | 3/2003 | Baerlocher et al. |
| 2003/0060267 | A1 | 3/2003 | Glavich et al. |
| 2003/0100356 | A1 | 5/2003 | Brown et al. |
| 2003/0157981 | A1 | 8/2003 | Marks et al. |
| 2003/0203753 | A1 | 10/2003 | Muir et al. |
| 2003/0207710 | A1 | 11/2003 | Rodgers et al. |
| 2004/0012145 | A1 | 1/2004 | Inoue |
| 2004/0014516 | A1 | 1/2004 | Inoue |
| 2004/0014517 | A1 | 1/2004 | Inoue |
| 2004/0018866 | A1 | 1/2004 | Inoue |
| 2004/0026854 | A1 | 2/2004 | Inoue |
| 2004/0033827 | A1 | 2/2004 | Gilmore et al. |
| 2004/0033829 | A1 | 2/2004 | Pacey et al. |
| 2004/0036218 | A1 | 2/2004 | Inoue |
| 2004/0038726 | A1 | 2/2004 | Inoue |
| 2004/0043809 | A1 | 3/2004 | Gomez et al. |
| 2004/0048651 | A1 | 3/2004 | Vorias et al. |
| 2004/0053669 | A1 | 3/2004 | Gerrard et al. |
| 2004/0053672 | A1 | 3/2004 | Baerlocher |
| 2004/0053676 | A1 | 3/2004 | Rodgers |
| 2004/0072612 | A1 | 4/2004 | Rodgers et al. |
| 2004/0097280 | A1 | 5/2004 | Gauselmann |
| 2004/0102236 | A1 | 5/2004 | Suda et al. |
| 2004/0137982 | A1 | 7/2004 | Cuddy et al. |
| 2004/0147306 | A1 | 7/2004 | Randall et al. |
| 2005/0020344 | A1 | 1/2005 | Kaminkow |
| 2005/0049035 | A1 | 3/2005 | Baerlocher et al. |
| 2005/0054429 | A1 | 3/2005 | Baerlocher et al. |
| 2005/0059446 | A1 | 3/2005 | Kaminkow |
| 2005/0064924 | A1 | 3/2005 | Glavich et al. |
| 2005/0070354 | A1 | 3/2005 | Baerlocher et al. |
| 2005/0101380 | A1 | 5/2005 | Glavich et al. |
| 2005/0119403 | A1 | 6/2005 | St. Clair |
| 2005/0148381 | A1 | 7/2005 | Marks et al. |
| 2005/0148384 | A1 | 7/2005 | Marks et al. |
| 2005/0227754 | A1 | 10/2005 | Kaminkow et al. |
| 2005/0282620 | A1 | 12/2005 | Marks et al. |
| 2005/0288094 | A1 | 12/2005 | Marks et al. |
| 2006/0030392 | A1 | 2/2006 | Rodgers et al. |
| 2006/0068875 | A1 | 3/2006 | Cregan et al. |
| 2006/0068882 | A1 | 3/2006 | Baerlocher et al. |
| 2006/0068884 | A1 | 3/2006 | Baerlocher et al. |
| 2006/0068885 | A1 | 3/2006 | Cregan et al. |
| 2006/0073876 | A1 | 4/2006 | Cuddy |
| 2006/0084494 | A1 | 4/2006 | Belger et al. |
| 2006/0089191 | A1 | 4/2006 | Singer et al. |
| 2006/0172795 | A1 | 8/2006 | Bussick et al. |
| 2006/0199636 | A1 | 9/2006 | Ching et al. |
| 2006/0199637 | A1 | 9/2006 | Ching et al. |
| 2006/0264254 | A1 | 11/2006 | Aoki |
| 2007/0010316 | A1 | 1/2007 | Baerlocher et al. |
| 2007/0021188 | A1 | 1/2007 | Rodgers et al. |
| 2007/0060248 | A1 | 3/2007 | Rodgers et al. |
| 2007/0060294 | A1 | 3/2007 | Cuddy et al. |
| 2007/0087812 | A1 | 4/2007 | Glavich et al. |
| 2007/0287523 | A1 | 12/2007 | Esses et al. |
| 2008/0051174 | A1 | 2/2008 | Fiden |
| 2008/0090655 | A1 | 4/2008 | Marks |
| 2008/0102931 | A1 | 5/2008 | Marks |
| 2008/0108411 | A1 | 5/2008 | Jensen et al. |
| 2008/0113765 | A1 | 5/2008 | DeWall |
| 2008/0132320 | A1 | 6/2008 | Rodgers |
| 2008/0139298 | A1 | 6/2008 | Rodgers et al. |
| 2008/0200232 | A1 | 8/2008 | Baerlocher et al. |

FOREIGN PATENT DOCUMENTS

| | | | |
|---|---|---|---|
| AU | 199917318 | A1 | 9/1999 |
| AU | 755879 | | 2/2001 |
| EP | 0 058 488 | | 8/1982 |
| EP | 0 060 019 | | 9/1982 |
| EP | 0 874 337 | | 10/1998 |
| EP | 0 981 119 | | 2/2000 |
| EP | 0 984 408 | | 3/2000 |
| EP | 1 063 622 | | 12/2000 |
| EP | 1 184 822 | | 3/2002 |
| EP | 1 205 894 | | 5/2002 |
| EP | 1 422 673 | | 5/2004 |
| EP | 1 513 117 | | 3/2005 |
| GB | 1 454 046 | | 10/1976 |
| GB | 2 062 922 | | 5/1981 |
| GB | 2 106 293 | | 9/1981 |
| GB | 2 081 952 | | 2/1982 |
| GB | 2 090 690 | | 7/1982 |
| GB | 2 096 376 | | 10/1982 |
| GB | 2 097 160 | | 10/1982 |
| GB | 2 100 905 | | 1/1983 |
| GB | 2 105 891 | | 3/1983 |
| GB | 2 106 295 | | 4/1983 |
| GB | 2 113 881 | | 8/1983 |
| GB | 2 117 155 | | 10/1983 |
| GB | 2 137 392 | | 10/1984 |
| GB | 2 161 008 | | 1/1986 |
| GB | 2 165 385 | | 4/1986 |
| GB | 2 170 643 | | 8/1986 |
| GB | 2 180 087 | A | 3/1987 |
| GB | 2 181 589 | | 4/1987 |
| GB | 2 183 882 | | 6/1987 |
| GB | 2 191 030 | | 12/1987 |
| GB | 2 222 712 | | 3/1990 |
| GB | 2 225 889 | | 6/1990 |
| GB | 2 226 436 | | 6/1990 |
| GB | 2 242 300 | | 9/1991 |
| GB | 2 262 642 | | 6/1993 |
| GB | 2 322 217 | A | 8/1998 |
| GB | 2 335 524 | A | 9/1999 |
| GB | 2 372 132 | | 2/2001 |
| GB | 2 393 555 | A | 3/2004 |
| WO | WO 97/32285 | | 9/1997 |
| WO | WO 98/20949 | | 5/1998 |
| WO | WO 00/30727 | | 6/2000 |
| WO | WO 00/32286 | | 6/2000 |
| WO | WO 00/66235 | | 11/2000 |
| WO | WO 00/76606 | | 12/2000 |
| WO | WO 01/26019 | | 4/2001 |
| WO | WO 03/026756 | | 4/2003 |
| WO | WO 2004/025584 | | 3/2004 |
| WO | WO 2005/028043 | | 3/2005 |
| WO | WO 2006/076294 | | 7/2006 |
| WO | WO 2007/002935 | | 1/2007 |
| WO | WO 2007/084766 | | 7/2007 |
| WO | WO 2007/130443 | | 11/2007 |
| WO | WO 2007/130444 | | 11/2007 |

OTHER PUBLICATIONS

All That Glitters website, written by WMS Gaming, published on or before Nov. 2007.

"Barn Yard by Aristocrat," article written by Strictly Slots, published Mar. 2002.

Bejeweled Web site, written by PopCap Games, http://www.popcap.com, published prior to Sep. 9, 2005.

Black Swan Paytable Display, written by IGT, published prior to 2001.

Break the Spell Advertisement written by Atronic Casino Technology, Ltd., published prior to Jan. 1, 2000.

"Cash Chameleon," article written by Strictly Slots/Aristocrat Leisure Industries, PTY Ltd., published in Apr. 2001.

Catch a Wave Advertisement written by IGT, published in Dec. 2000.

Cossack Dancer Advertisement written by Olympic Video Gaming, published prior to 2002.

"Expanding Symbol," Description, written by IGT, published Sep. 1999.

"Gaming Machine with Animating Symbols," Description, written by IGT, published Jan. 2000.

"Symbol Feature in Australian UFO Gaming Machine," Description written by Barcrest, Ltd., published 1995.

(56) References Cited

OTHER PUBLICATIONS

"Traveling Symbols," Description, written by IGT, published Sep. 1999.
Double Diamond Line Advertisement written by Bally Gaming Systems, published in 2000.
Easy Street Advertisements and Articles, written by Casino Data Systems, published in 2000.
Enchanted Forest™ Gaming Description from Aristocrat, available in 1994.
Enchanted Unicorn Advertisement written by IGT, published in 2001.
"Fishin' Buddies," article published in Strictly Slots/Anchor Games, published in Apr. 2001.
"Ghoulish Gamble," article written by Strictly Slots/IGT, published Sep. 2000.
Gold Fever Advertisement, written by Atronic Casino Technology, Ltd., published 1999.
Gold Fever by Atronic, Web Site, written by Atronic Casino Technology, published Mar. 2002.
"Gooooaal!" written by Bally Gaming, Inc., published Dec. 2000.
"It's a Blast," written by IGT, published on or before Dec. of 2004.
Jewel in the Crown Advertisements, written by Barcrest Ltd., published 1999.
Joker's Wild Advertisement written by IGT, published prior to 2001.
"Juicy Loot" by Bally Technologies, article from Strictly Slots, published Feb. 2008.
Kaboom game Web Site, including relevant portions of multiple web pages, written by WMS Gaming, http://www.wmsgaming.com/products/video/kaboom/index.php, published prior to Sep. 9, 2005.
Kaboom game website, written by WMS Gaming, published on or before Nov. 2007.
Loco Loot Article written by Strictly Slots/Aristocrat Leisure Industries, PTY Ltd., published in May 2002.
Fey, Marshall, "Slot Machines," published by Reno-Tahoe Specialty, Inc., pp. 1-34, 1989.
"Mountain Money," article written by Strictly Slots/Aristocrat Leisure Industries, PTY Ltd., published in Jun. 2002.
Mystery Mine Advertisement, Konami Australia Pty. Ltd., published Jan. 1999.
On the House Advertisement written by Olympic Video Gaming, published prior to 2002.
Penguin Pays Advertisement written by Aristocrat Incorporated, published in 1998.
"Reel Magic™ Gaming Machine," Description written by IGT, available in 1986.
South Park Advertisement, written by IGT, published Sep. 1999.
Wild Bear Salmon Run Advertisement written by IGT, published in 2003.
Wild Streak Advertisement written by WMS Gaming, Inc., published in 2001.
Your Real Key to Gaming Success Advertisement (including Roll Over Beethoven and Fortune) written by Olympic Video Gaming, available prior to Jun. 2007.

* cited by examiner

GAMING SYSTEM, GAMING DEVICE, AND METHOD FOR PROVIDING A CASCADING SYMBOLS GAME WITH WILD SYMBOLS USABLE FOR A DESIGNATED QUANTITY OF SYMBOL GENERATIONS

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur provide higher awards. In such known gaming machines, the amount of the wager made on the base game by the player may vary.

Certain known gaming machines are configured to provide an award based on a winning symbol combination that includes one or more Wild symbols. In these gaming machines, the Wild symbols are configured to be analyzed as any symbol necessary to create a winning combination of symbols. For example, a combination of two identical symbols an a Wild symbol may be treated as a combination of three identical symbols.

Gaming machines which provide cascading symbol games are also known. In one such cascading symbol game, a gaming machine generates and displays a plurality of symbols in a plurality of symbol positions. The gaming machine evaluates the displayed symbols and provides an award for each winning symbol combination formed. The gaming machine then removes the displayed symbols that form the winning combination(s) of symbols to create one or more empty symbol positions. The gaming machine shifts zero, one, or more of the remaining displayed symbols into zero, one, or more of the empty symbol positions. If any empty symbol positions remain, the gaming machine generates and displays a symbol for each empty symbol position. The gaming machine reevaluates the displayed symbols and provides an award for each winning symbol combination formed. The gaming machine repeats the steps of removing generated symbols, shifting generated symbols, generating new symbols if winning symbol combinations continue to be formed, and evaluating generated symbols. Repeating the steps as described increases player excitement and enjoyment by providing awards for symbol combinations not available for the initial generation of symbols.

There is a continuing need to increase this excitement and entertainment for people playing gaming machines. There is also need for new ways of providing better gaming experiences and environments at gaming machines. There is a further need for increasing the number of awards provided to a player for a single wager on a play of a primary game.

SUMMARY

The present disclosure relates generally to gaming systems, gaming devices, and methods for providing a cascading symbol game, and more particularly to a gaming system, gaming device, and method for providing a cascading symbol game wherein one or more Wild symbols are potentially usable to form one or more winning symbol combinations for each of a designated quantity of symbol generations for a play of the game.

In one embodiment, a gaming system enables a player to wager on a play of a game configured to display a matrix of symbol positions. In this embodiment, the matrix includes a plurality of rows of symbol positions and a plurality of columns of symbol positions. In one such embodiment, the matrix of symbol positions is associated with a plurality of orders or sets of symbols that are available to be initially generated in such symbol positions. In another embodiment, for a play of the game, the gaming system randomly generates and displays one of a plurality of symbols in each symbol position of the matrix. In one embodiment, at least one of the plurality of symbols is a designated symbol, such as a Wild symbol, associated with an indicated quantity. In one such embodiment, the indicated quantity represents a quantity of symbol generations for which the designated symbol will remain active. In one embodiment, a generated designated symbol is active or inactive depending on the indicated quantity associated with that designated symbol.

After generating and displaying a plurality of symbols for a play of the game, the gaming system determines whether the generated symbols form any winning symbol combinations. In one embodiment, the gaming system causes an award to be provided for each of any winning symbol combinations generated. In one embodiment, the gaming system removes any non-designated symbols from any generated winning symbol combinations, resulting in one or more empty symbol positions. In this embodiment, each removed symbol represents an opportunity to create one or more new, potentially winning symbol combinations using either symbols already generated and displayed in the matrix or newly generated symbols.

In one embodiment, if any designated symbols are generated for the play of the game, the gaming system decrements the indicated quantity associated with each of the generated designated symbol(s). In this embodiment, the gaming system also determines whether each of any generated designated symbol(s) are active. In one embodiment, if the indicated quantity associated with any designated symbol is equal to or less than a predefined quantity, the designated symbol is inactive and the gaming system removes it from the matrix, resulting in an empty symbol position. For example, if the indicated quantity associated with a designated symbol is zero, the gaming system determines that the designated symbol, is inactive and removes the designated symbol from the symbol matrix. In this embodiment, if the indicated quantity exceeds the predefined quantity, the designated symbol remains active and the gaming system does not remove the it from the matrix. For example, if an indicated quantity associated with a designated symbol is above zero, the gaming system determines that the designated symbol is active and does not remove it from the symbol matrix. In one embodiment, the gaming system decrements the indicated quantity associated with each designated symbol for each generation of one or more symbols. In an alternative embodiment, the gaming system only decrements the indicated quantity associated with any designated symbol if that designated symbol is included in at least one winning symbol combination.

In one embodiment, removing any appropriate symbols results in one or more empty symbol positions. In various embodiments, the gaming system fills at least one, a plurality, or each of any empty symbol positions by shifting one or more remaining displayed symbols to the one or more empty symbol positions. In one embodiment, a displayed symbol is shifted to an adjacent symbol position. For example, the gaming system shifts a symbol displayed adjacently above an empty symbol position downward within the same column of the symbol matrix to the adjacent empty symbol position. In a further example, the gaming system repeats this shifting for all remaining symbols and for any subsequently created empty symbol positions until no displayed symbols are positioned above an empty symbol position. It should be appreciated that in this example, the symbols appear to cascade downward to fill one or more empty symbol positions. In various embodiments, the gaming system shifts one or more symbols in one or more different directions, such as horizontally within one of the rows of the symbol matrix or upward within one of the columns of the symbol matrix.

In one embodiment, shifting one or more symbols results in one or more empty symbol positions that cannot be filled by shifting already-displayed symbols. In this embodiment, the gaming system generates one of the plurality of symbols for each remaining empty symbol position. It should be appreciated that the generation of new symbols represents an opportunity to generate additional winning symbol combinations and/or one or more additional designated symbols.

In one embodiment, after the gaming system has generated and displayed additional symbols, the gaming system determines whether any new winning symbol combinations are displayed and provides any appropriate awards. The gaming system then removes any non-designated symbols from the winning symbol combination, decrements the indicated quantities associated with any displayed designated symbols, and removes any inactive designated symbols. The gaming system shifts any remaining symbols to fill one or more empty symbol positions as described above, and generates and displays symbols to fill any empty symbol positions not filled by the shifting process. These steps are repeated in one embodiment until the generated symbols no longer form any winning symbol combinations.

In one embodiment, the gaming system causes a total award to be displayed and provided based on awards determined for any winning symbol combinations from the play of the game. In one embodiment, the total award is based on the sum of the awards for any winning symbol combinations. In one embodiment, the total award is based, at least in part, on a number of designated symbols generated. In various embodiments, the total award is based on a number of shifted symbols, a number of generated and displayed symbols, and/or a number of winning symbol combinations for a play of the game.

In one embodiment, the primary game of the disclosed gaming system is displayed as a slot game including a plurality of reels, each reel including a plurality of symbol positions. The gaming device generates one of a plurality of symbols for each symbol position. In one embodiment, the plurality of symbols includes a designated symbol such as a Wild symbol which is usable as any symbol of a winning symbol combination. In this embodiment, the indicated quantity is displayed in one of the symbol positions along with the Wild symbol. The indicated quantity associated with each Wild symbol in various embodiments is predetermined or is determined at the time the designated symbol is generated. In different embodiments, the indicated quantity for one or more Wild symbols is based on a wager on a play of the primary game, based on a side wager, based on total coin-in, based on a player's status, or based on a player's ranking. In one embodiment, the indicated quantity represents a quantity of generations of symbols for which the Wild symbol may form a winning symbol combination.

In one embodiment, after providing any awards for any generated winning symbol combinations (including combinations formed with one or more Wild symbols), the gaming system decrements the indicated quantity associated with each generated Wild symbol, regardless of whether it is used to generate a winning symbol combination. The gaming system compares the resulting indicated quantities against a predefined quantity, such as the quantity of zero. In one embodiment, if the indicated quantity associated with a Wild symbol is greater than zero, the gaming system does not remove the Wild symbol. In this embodiment, if the indicated quantity is equal to zero, the gaming system removes the Wild symbol, resulting in an empty symbol position. In an alternative embodiment, the gaming system does not decrement the associated quantity of one or more Wild symbols unless the Wild symbols are included in one or more winning symbol combinations.

In various embodiments, each generation and display of one or more symbols for which a designated symbol is active is more likely to generate a winning symbol combination because the designated symbol is a Wild symbol. Accordingly, the disclosed gaming system provides a player with an opportunity to win multiple awards for multiple generations of symbols, wherein one or more generated designated symbols is usable for a plurality of generations and thus is potentially usable in a plurality of winning symbol combinations. Moreover, since in various embodiments designated symbols remain displayed for a number of symbol generations, the designated symbols are more likely to accumulate in the lower symbol positions of the disclosed gaming device. Thus, winning symbol combinations are more likely to be generated for more generations, shifts, and re-generations. For at least these reasons, the disclosed designated symbols increase player excitement and enjoyment.

It is an advantage of the disclosed gaming system to provide a first award for any generated winning symbol combinations, remove one or more symbols from the game, shift one or more symbols into an empty symbol position, generate symbols for any remaining empty symbol positions, and provide a second award for any winning symbol combinations, wherein the symbols include a designated symbol potentially usable in a quantity of winning symbol combinations determined by an indicated quantity.

Additional features and advantages are described in, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system, may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
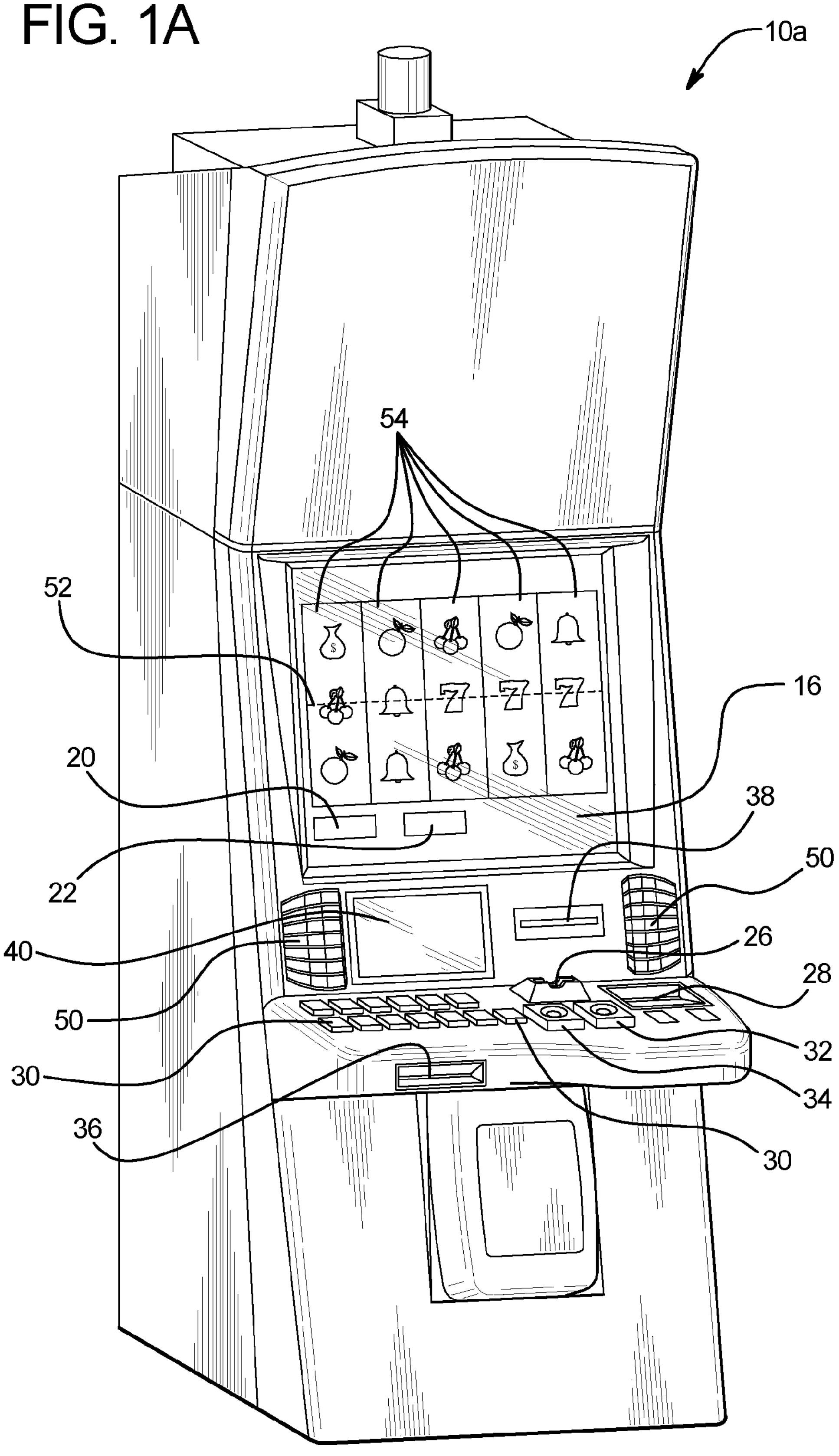
FIGS. 1A and 1B are perspective views of example alternative embodiments of the gaming device of the present disclosure.
Figure 1B:
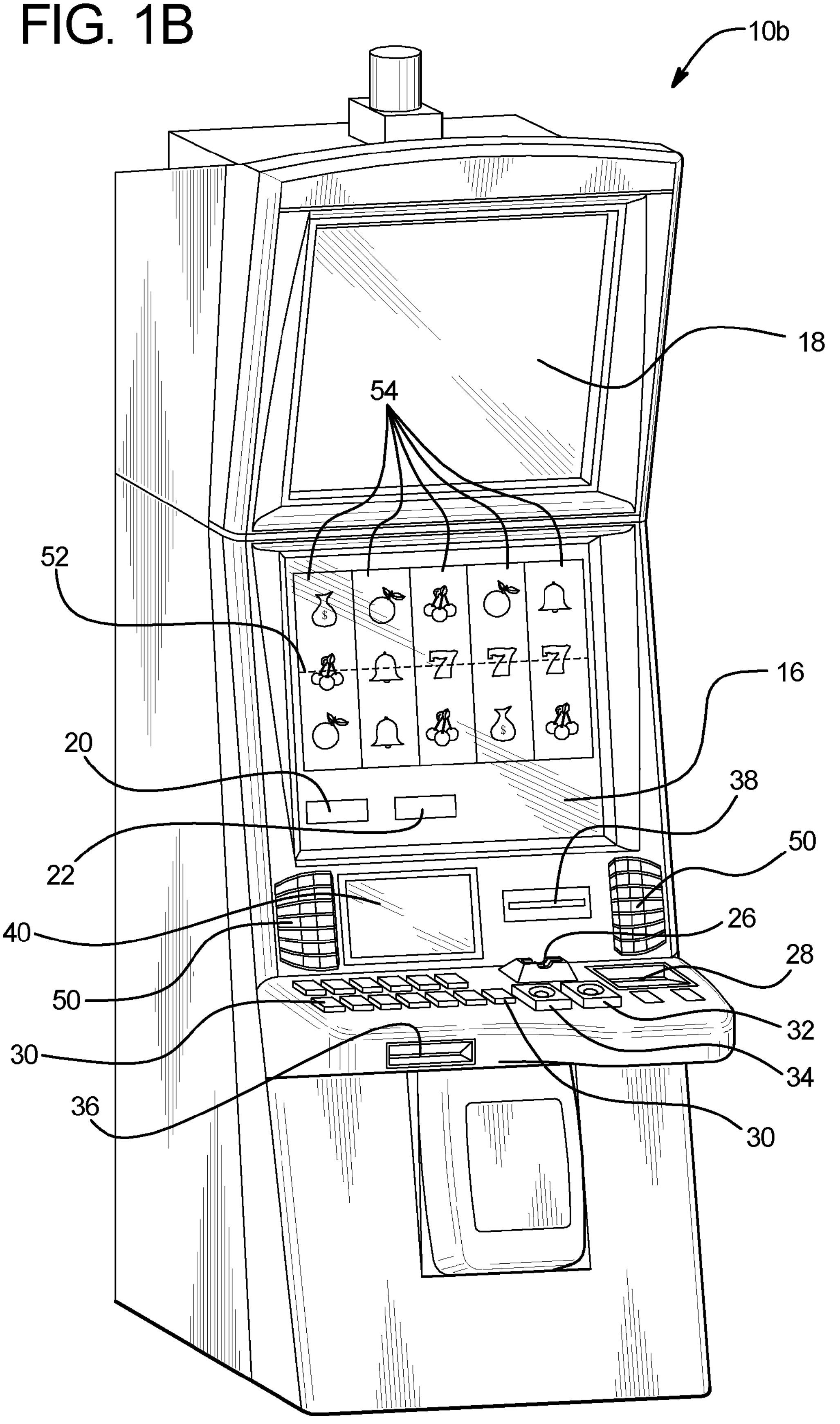

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
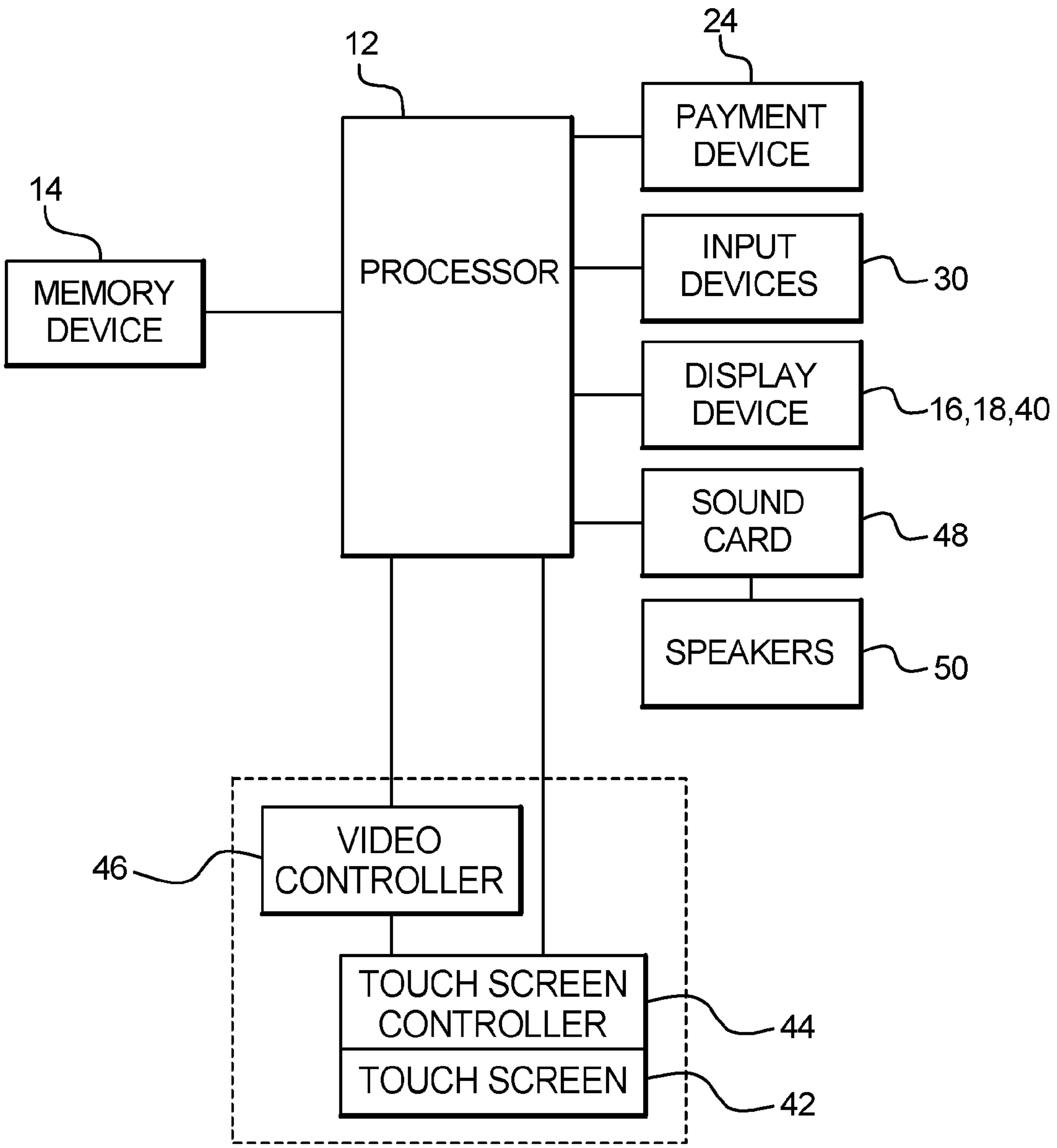
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASICs). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices 16, 18, and 40 controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In further embodiments, displays 16 and 18 may also include a targets accumulated display area 304 and a collectors accumulated display area 306 indicating the number of accumulated targets and collectors for a given gaming device.

In one embodiment, the gaming device includes a player tracking display 40 which displays information regarding a player's play tracking status. In further embodiments, the gaming system includes a single, large display prominently placed (not illustrated) to enable individuals in a gaming area to visually determine the number of collectors and targets accumulated by each gaming device in the gaming system.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices may include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

Figure 2B:
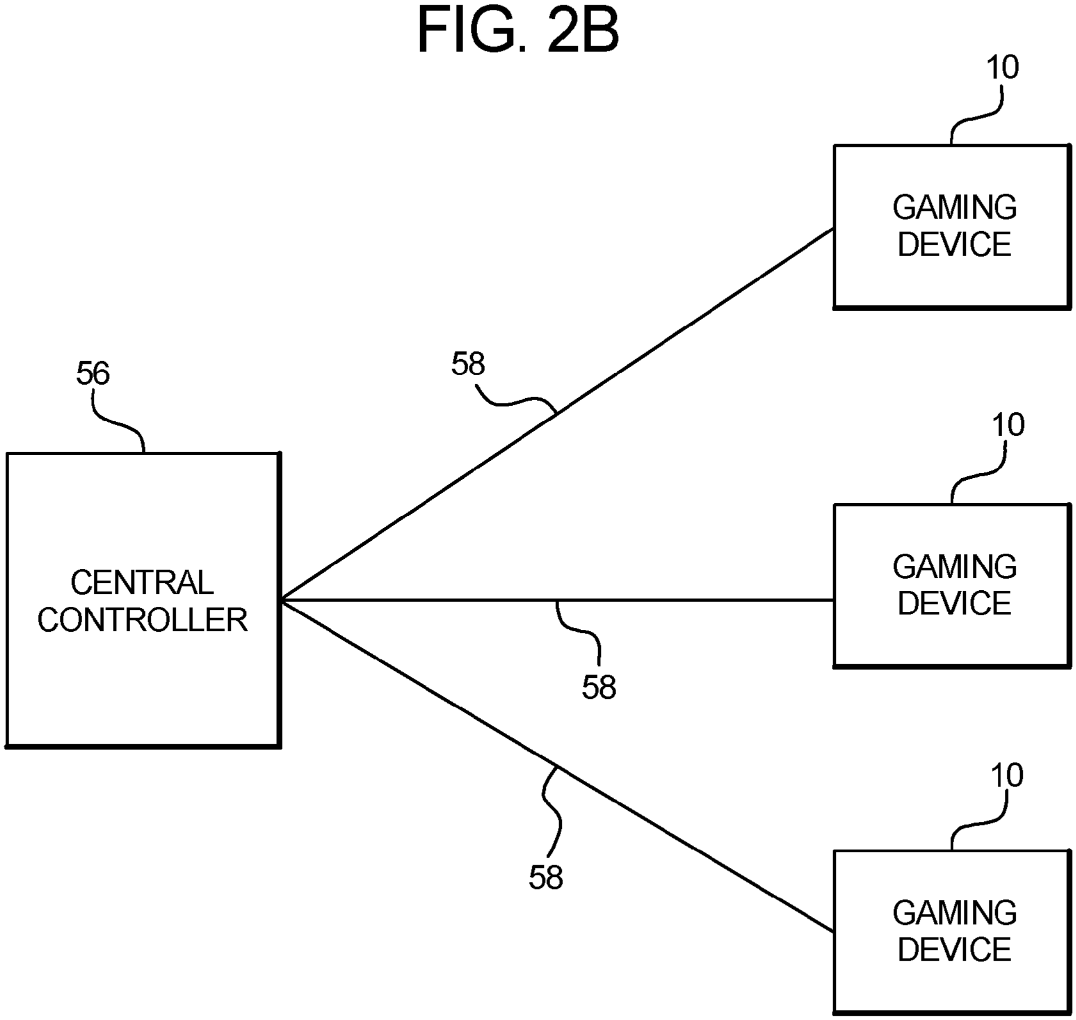
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Cascading Symbols Game Including Wilds Having Indicated Quantities

The gaming system disclosed herein is configured to provide an award based on a plurality of generations of one or more symbols in one or more empty symbol positions for a play of a game. In one embodiment, for a play of the game, the gaming system generates and displays a symbol in each of a plurality of symbol positions. In this embodiment, one or more of the generated symbols may be a designated symbol having an indicated quantity. If any of the generated symbols are designated symbols, the gaming system in one embodiment determines whether each of the designated symbols is active or inactive based on the indicated quantity. In one embodiment, the gaming system also determines whether any combination of the plurality of generated symbols forms a winning symbol combination and provides an award for any such winning symbol combination.

In one embodiment, the gaming system decrements the indicated quantity associated with each of any generated designated symbols. In one embodiment, the gaming system removes any inactive designated symbols and also removes any non-designated symbols included in any generated winning symbol combination, which results in at least one empty symbol position. In one embodiment, the gaming system shifts one or more remaining (i.e., non-removed) symbols into one or more empty symbol positions. In one embodiment, this shifting occurs by moving any remaining symbols as far as possible in a given direction while maintaining the same relative order of the symbols. In various embodiment, the gaming system shifts one, more than one, or all symbols positioned in a given relationship to each empty symbol position to fill one, more than one, or all of the empty symbol positions.

After shifting the one or more remaining symbol(s), the gaming system in one embodiment generates and displays a new symbol in each of any remaining empty symbol positions and determines and provides an award for any newly generated winning symbol combinations. In one embodiment, the gaming system repeats the above steps until no winning symbol combination is displayed.

Figure 3:
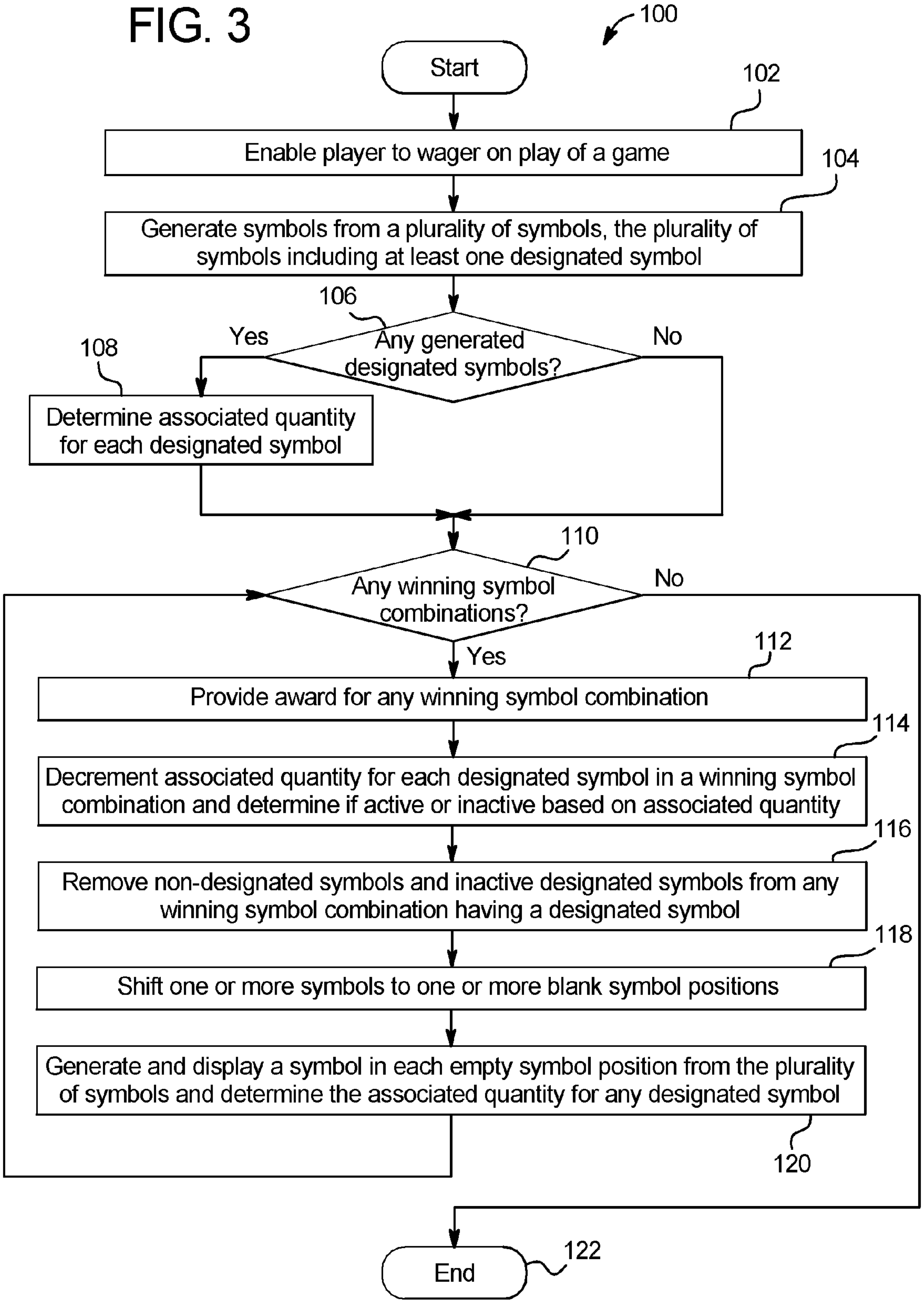
FIG. 3 is a flow chart of an example process for providing a game of the gaming system disclosed herein illustrating at least one designated IL; symbol existing for an indicated quantity associated with generations.

Referring to FIG. 3, an example embodiment of a process 100 for operating a gaming system providing the game disclosed herein is illustrated. Although the example process 100 for operating the gaming system for providing the disclosed game is described with reference to the flow chart illustrated in FIG. 3, many other methods of operating a gaming system are contemplated. For example, the order of certain of the blocks may be changed, and certain of the blocks described are optional.

The gaming system enables a player to wager on a play of a game as indicated by block 102. In one embodiment, the game is displayed as having a plurality of reels, each reel including a plurality of symbol positions. It should be appreciated that in various embodiments, the gaming system displays the generation of the symbols of a reel game as a cascading or falling symbol game. For a wagered on play of the game, the gaming system generates and displays a symbol from a plurality of symbols in each of the plurality of symbol positions, as indicated by block 104. As further indicated by block 104, the plurality of symbols in one embodiment includes at least one designated symbol. In one embodiment, each designated symbol is associated with an indicated quantity indicative of whether that designated symbol is active or inactive, and further indicative of a number of generations and displays of one or more symbols for which that designated symbol will remain active.

In this illustrated embodiment, for each generation and display of a plurality of symbols, the gaming system determines whether one or more designated symbols are generated as indicated by block 106. If at least one designated symbol is generated, the gaming system determines an indicated quantity for the at least one generated designated symbol, as indicated by block 108. In various embodiments, the indicated quantity associated with a first generated designated symbol is different from the indicated quantity associated with a second generated designated symbol.

In the illustrated embodiment, for each generation and display of one or more symbols, the gaming system also determines whether any winning symbol combinations are generated, as indicated by block 110. If no winning symbol combinations are generated, the gaming system ends the wagered on play of the primary game, as indicated by block 122.

If one or more winning symbol combinations are generated, the gaming system causes an award to be displayed and provided to the player based on the one or more generated winning symbol combinations, as indicated by block 112. It should be appreciated that in one embodiment, wherein the gaming system is configured to analyze each of any generated designated symbols as a Wild symbol, each generated designated symbol increases the likelihood of generating a winning symbol combination. In one such embodiment, the gaming system generates and displays three identical generated symbols and a designated symbol on one of a plurality of paylines. In this embodiment, the gaming system provides an award to the player for a winning symbol combination including four identical generated symbols. Thus, in various embodiments, a generated designated symbol increases the likelihood of forming or obtaining a winning symbol combination (e.g., an otherwise non-winning combination of two identical symbols becomes a winning combination of two symbols and a designated symbol) and/or increases the likelihood that any awards will have a relatively high value (e.g., a winning combination of three identical symbols and a designated symbol results in an award for a winning combination of four symbols).

In the illustrated embodiment, after providing an award to the player for any generated winning symbol combinations, the gaming system decrements the indicated quantity associated with each of any generated designated symbol, as indicated by block 114. In one embodiment, for each of any generated designated symbols, the gaming system determines whether that designated symbol is active or inactive based on the decremented indicated quantity associated with the designated symbol. In one example embodiment, the gaming system determines that a generated designated symbol is inactive if the indicated quantity associated with the designated symbol is equal to or less than a predefined quantity, such as a predefined quantity of zero. In various embodiments, the gaming system only decrements the indicated quantity associated with any designated symbol included in one or more generated winning symbol combinations.

In the illustrated embodiment, the gaming system removes any inactive designated symbols and any non-designated symbols included in any winning symbol combination from one or more of the plurality of symbol positions, as indicated by block 116. In this embodiment, removing such symbols results in one or more empty symbol positions.

In the illustrated embodiment, the gaming system displays a symbol in one or more empty symbol positions created by removing any symbols by shifting (according to applicable game rules) one or more remaining symbols into one or more of any empty symbol positions, as indicated by block 118. For example, under one set of applicable game rules wherein symbols are shifted downward to fill empty symbol positions, if a winning symbol combination results in a displayed empty symbol position along a top row of symbol positions, the gaming system will not shift any symbols to fill the empty symbol position. In this example, under the applicable set of game rules, if a winning symbol combination results in a displayed empty symbol position along a bottom row of symbol positions, the gaming system will shift at least one symbol positioned above the empty symbol position downward to fill the empty symbol position. In one such embodiment, the gaming system shifts any remaining symbols by as many symbol positions as possible in a given direction, while maintaining the position of each shifted symbol relative to one or more other symbols or coordinates. For instance, the gaming system in one embodiment moves each symbol positioned adjacently above an empty symbol position on column of a matrix displayed as a reel downward as far as possible to occupy one or more empty symbol positions while maintaining the relative order of the symbols of that column of the matrix from top to bottom. In this embodiment, shifting the non-removed symbols does not result in fewer empty symbol positions. Rather, shifting the non-removed symbols results in a plurality of different empty symbol positions wherein each empty symbol position has a given relationship to any remaining symbols, the relationship based on the direction of shifting. In one embodiment, for each of a plurality of columns of a matrix, displayed as a plurality of reels, each of empty symbol positions on the displayed reel resulting form shifting one or more non-removed symbols is above each of any remaining displayed symbols on the displayed reel.

In the illustrated embodiment, the gaming system generates and displays a symbol in each of any empty symbol positions created by shifting one or more remaining symbols in a given direction, as indicated by block 120. In one embodiment, one or more of any additional generated and displayed symbols is a designated symbol. In this embodiment, if one or more of the generated symbols is a designated symbol, the gaming system determines an indicated quantity for each generated designated symbol, as indicated by block 120.

In the illustrated embodiment, the gaming system determines whether the generated symbols (i.e., the non-removed symbols from a previous generation and display of at least one symbol and the newly generated and displayed symbols) form any winning symbol combination, as indicated by block 110. If no new winning symbol combinations are generated, the gaming system ends the play of the primary game, as indicated by block 122.

Alternatively, if the generated symbols form one or more generated winning symbol combinations, as indicated by block 110, the gaming system in one embodiment repeats the loop defined by blocks 112, 114, 116, 118, and 120, including providing an award, decrementing the indicated quantity associated with each of the designated symbol(s), removing at least one symbol, shifting any appropriate symbol(s), and generating at least one symbol. In one embodiment, the gaming system repeats this loop until no winning symbol combination is generated, as indicated by block 122.

FIGS. 4A to 4G illustrate a play of one embodiment of the game disclosed herein played according to the process 100 of FIG. 3. In the illustrated embodiment, the play of the game illustrated by FIGS. 4A to 4G includes a plurality of generations and displays of one or more symbols. It should be appreciated that FIGS. 4A to 4G represent a plurality of views of the disclosed gaming system playing the disclosed game. In the illustrated embodiment, the shifting described below and illustrated in FIGS. 4A to 4G facilitates a theme of the game, such as falling, tumbling, or cascading symbols.

The gaming system of the embodiment illustrated by FIGS. 4A to 4G is configured to generate a symbol in each of a plurality of symbol positions from a plurality of symbols. In various embodiments, the plurality of symbols includes at least one designated symbol. In the illustrated embodiment, the plurality of symbols includes a designated symbol which is illustrated as a large W (that is, a Wild) symbol. Moreover, in the illustrated embodiment, each generated designated (i.e., Wild) symbol is associated with an indicated quantity, indicated as a numeral in parentheses next to the designated symbol. In various embodiments, the gaming system displays the indicated quantity associated with a designated symbol by color of the designated symbol (i.e., the designated symbol fades from black to white as the indicated quantity decreases). In one embodiment, the gaming system displays an indicated quantity on a separate counter associated with each designated symbol. In various embodiments, these separate counters are located on different parts of the display device 16 of the gaming system.

In the illustrated embodiment, for various generations and displays of one or more symbols, the gaming system generates a plurality of Wild symbols including a plurality of different indicated quantities. In the illustrated embodiment, if the indicated quantity associated with any Wild symbol is zero, the gaming device determines that that specific Wild symbol is inactive and the gaming system removes the Wild symbol from its symbol position, creating an empty symbol position. In various embodiments (not shown), the gaming system is configured to generate one or more designated symbols having initial indicated quantities of zero. In these embodiments, the gaming system is configured to enable the designated symbol to be used for a single generation and display, despite an indicated quantity of zero.

In the embodiment illustrated in FIGS. 4A to 4G, the gaming system is configured to decrement the quantity of each of any displayed designated symbols for a generation and display of one or more plays of the game, so long as at least one winning symbol combination is generated. In the illustrated embodiment, if no winning combination of symbols is generated, the play of the game is over, regardless of whether a designated symbol is generated and displayed.

Figure 4A:
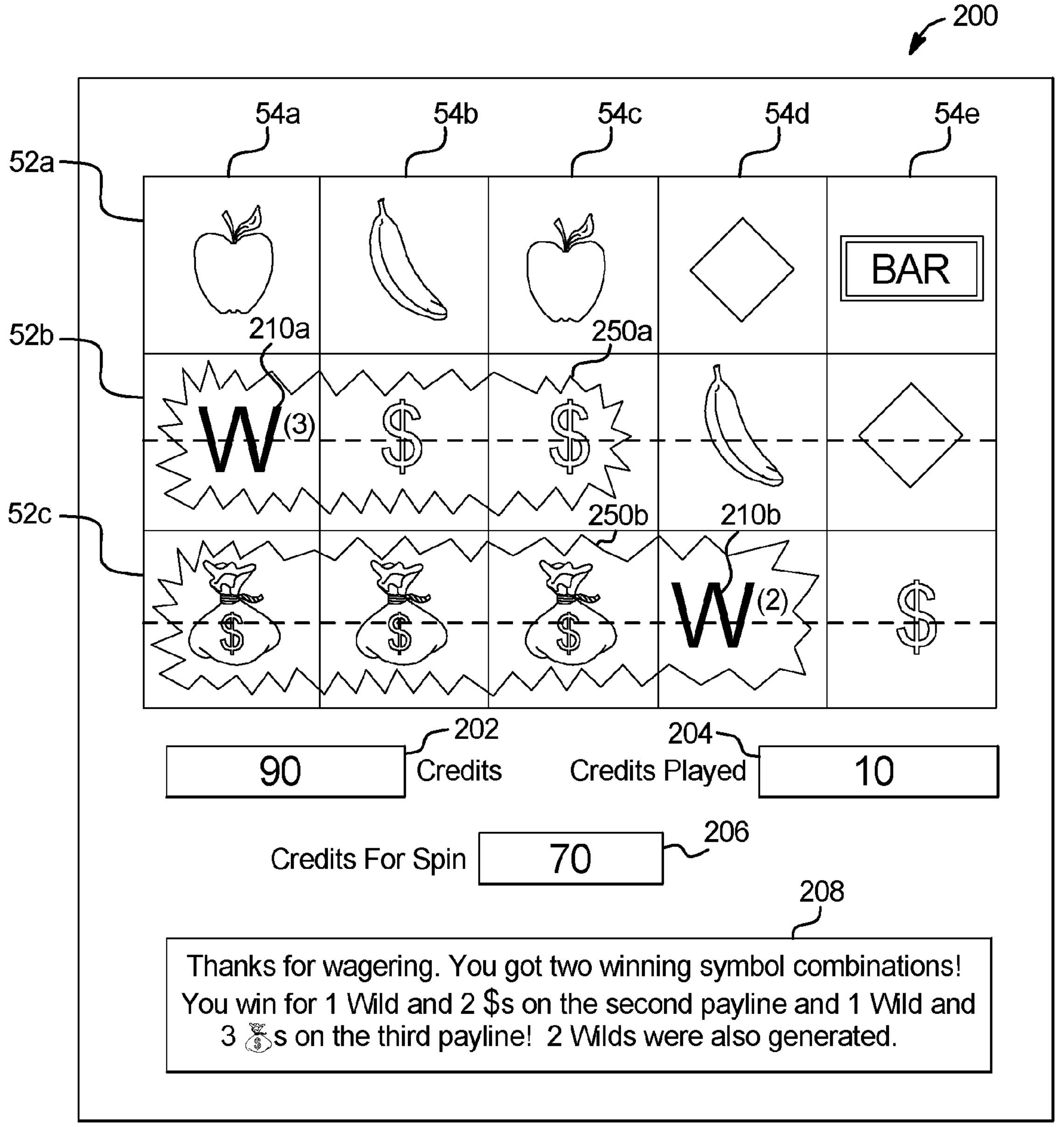
FIGS. 4A, 4B, 4C, 4D, 4E, 4F, and 4G are front elevation views of the gaming system disclosed herein illustrating a play of the game which includes generating a plurality of designated symbols, generating a plurality of winning symbol combinations, and shifting a plurality of symbols.

FIG. 4A illustrates a first generation of a plurality of symbols for a wager on a play of the game disclosed herein. The gaming system 200 of FIG. 4A indicates that the player wagered 10 credits on the illustrated play of the game, as indicated by credits played display area 204. Moreover, the player began the illustrated play of the game with 100 credits, a quantity of credits which was reduced by 10 credits to a total of 90 remaining credits, indicated by credits display area 202. For the wagered on play of the game, the gaming system generates and displays three symbols on each of the plurality of reels 54*a*, 54*b*, 54*c*, 54*d*, and 54*e*. As illustrated, the gaming system generates and displays two Wild symbols 210*a* and 210*b* and a plurality of non-designated symbols. In this embodiment, each Wild symbol 210*a* and 210*b* is a designated symbol including an indicated quantity, indicated as a numeral contained in a set of parentheses. Designated Wild symbol 210*a* includes an indicated quantity of three, and designated Wild symbol 210*b* includes an indicated quantity of two. Since in the illustrated embodiment the designated quantity of both Wild symbols 210*a* and 210*b* exceed zero, both designated Wild symbols are active. Moreover, designated Wild symbol 210*a* will remain active for as many as three generations and displays of one or more symbols, and designated Wild symbol 210*b* will be active for as many as two generations and displays of one or more symbols.

The gaming system illustrated in FIGS. 4A to 4G includes one or more paytables (not shown) indicating awards for combinations of symbols including three or more identical symbols. Further, the gaming system illustrated in FIGS. 4A to 4G is configured to provide an award for a winning combination of symbols appearing on any one of a plurality of paylines. It should be appreciated that in the illustrated embodiment the gaming system is configured to provide an award for winning combinations of three or more identical symbols occurring on a plurality of non-horizontal paylines, such as paylines arranged diagonally and/or paylines arranged partially diagonally and partially horizontally.

Referring still to FIG. 4A, for the illustrated generation and display of a plurality of symbols, the gaming system 200 generates two winning symbol combinations 250*a* and 250*b*. Both winning symbol combinations 250*a* and 250*b* are displayed along a horizontal payline associated with one of rows 52*a*, 52*b*, or 52*c*. Specifically, winning symbol combination 250*a* includes two dollar-sign symbols and a designated Wild symbol 210*a* in row 52*b*. Thus, the gaming system 200 provides an award indicated by one or more paytables associated with the gaming system, the award being based on a winning combination of three dollar-sign symbols. Winning symbol combination 250*b* includes three Moneybag symbols and a designated Wild symbol 210*b* in row 52*c*. Thus, the gaming system also provides an award indicated by one or more paytables associated with the gaming system, the award being based on a winning combination of four Moneybag symbols.

As indicated by credits for spin indicator 206, the gaming system provides an award of seventy for the two generated winning symbol combinations 250*a* and 250*b*. It should be appreciated that the award indicated in credits for spin indicator represents the total award for a plurality of generations and displays of one or more symbols for a play of the game. In the embodiment illustrated in FIG. 4A, the play of the game only includes one generation and display of at least one symbol.

As further indicated in FIG. 4A, game information display area 208 displays a summary of a plurality of events for a single generation and display of one or more symbols. In one embodiment, the game information display area 208 displays information about generated designated symbols, generated winning symbol combinations, awards provided, symbols removed, symbols shifted, generated symbols for empty symbol positions, and/or the end of a play of the game. Specifically, game information display area 208 of FIG. 4A indicates that the player receives an award for two winning symbol combinations 250*a* and 250*b*. Game information display area 208 further indicates that two Wild symbols (i.e., two designated Wild symbols 210*a* and 210*b*) were generated for the generation and display of one or more symbols illustrated in FIG. 4A.

Figure 4B:
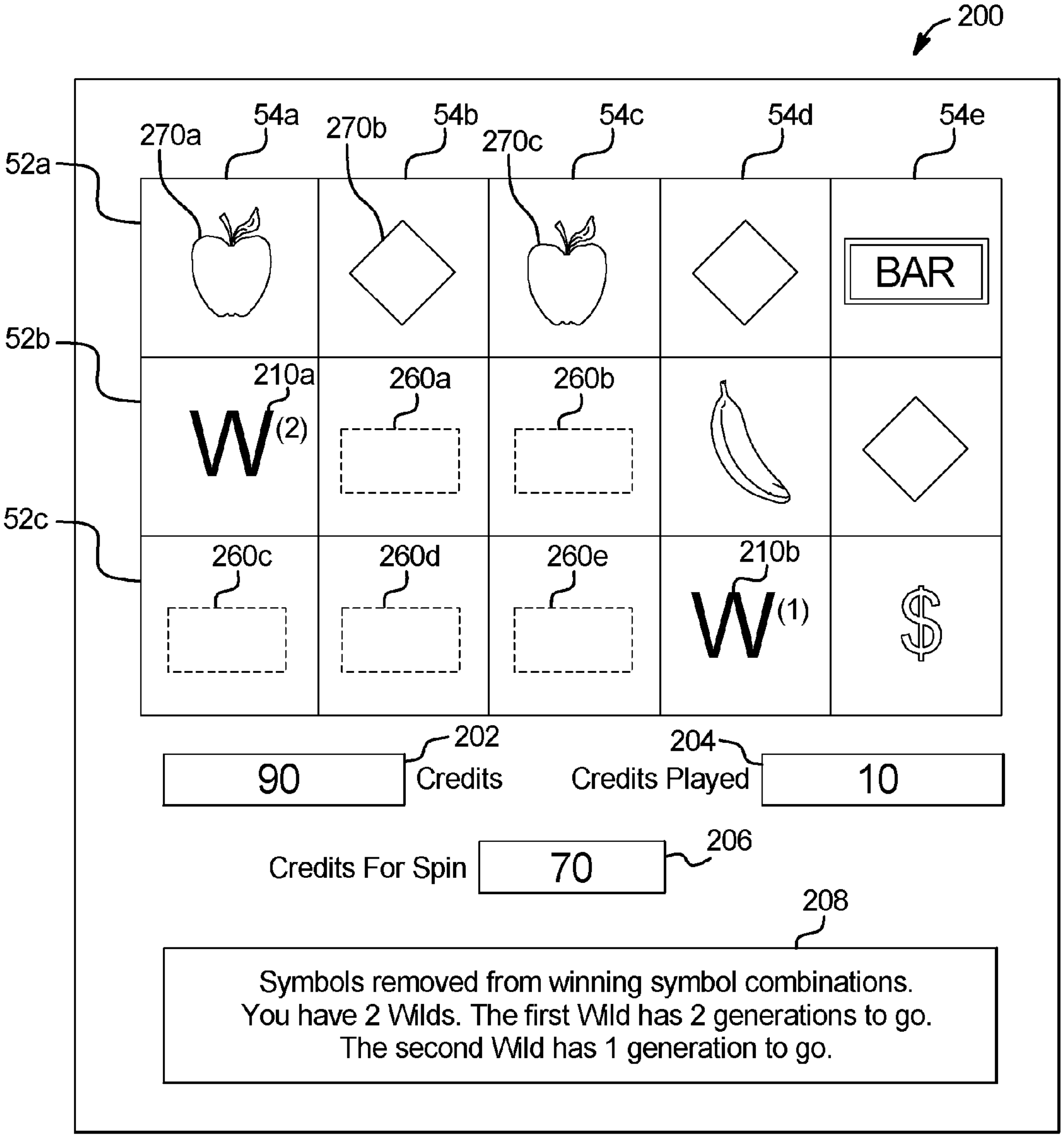

As illustrated in FIG. 4B, after displaying and providing an appropriate award for winning symbol combinations 250*a* and 250*b*, the gaming system 200 decrements the indicated quantity associated with each designated Wild symbol 210*a* and 210*b*. In the illustrated embodiment, designated Wild symbol 210*a* thus has an indicated quantity of two and designated Wild symbol 210*b* has an indicated quantity of one. Because both indicated quantities exceed the designated quantity of zero, both designated Wild symbols are active and remain displayed for at least one more generation and display of at least one symbol. Game information display area 208 also indicates that because designated Wild symbol 210*a* has an indicated quantity (after decrementing) of two, it is active for two more generations and displays of one or more symbols. Similarly, game information display area 208 indicates that because designated Wild symbol 210*b* has an indicated quantity (after decrementing) of one, it is active for one more generation and display of one or more symbols.

As further indicated by FIG. 4B, the gaming system 200 removes the symbols previously displayed at symbol positions 260*a*, 260*b*, 260*c*, 260*d*, and 260*e* from the game. As indicated in FIG. 4A, these symbols were the non-designated (i.e., non-Wild) symbols included in winning symbol combinations 250*a* and 250*b*. Gaming system 200 further indicates this removal in game information display area 208. The removal of each of the symbols at symbol positions 260*a*, 260*b*, 260*c*, 260*d*, and 260*e* results in symbol positions 260*a*, 260*b*, 260*c*, 260*d*, and 260*e* being empty symbol positions. It should be appreciated that had the indicated quantity associated with either of the designated Wild symbols 210*a* or 210*b* been equal to zero after decrementing, the gaming system 200 would have removed the designated Wild symbol 210*a* or 210*b* with the indicated quantity of zero from the appropriate reel 54*a* or 54*d*, resulting in at least one additional empty symbol position.

The gaming system illustrated in FIGS. 4A to 4G is configured to fill one or more empty symbol positions created by removing non-designated symbols from winning symbol combinations and inactive designated symbols by shifting one or more symbols downward. In the illustrated embodiment, shifting symbols downward causes the shifted symbols to remain on the same reel—that is, in the same column of the symbol matrix. Moreover, the gaming system shifts any displayed symbols downward as far as possible without changing the relative order of the symbols on a reel. In an example embodiment, each of the reels of the game includes three symbol positions, with the top two symbol positions including a generated symbol and the bottom symbol position being empty. In this embodiment, the gaming system shifts each of the two generated symbols downward by one symbol position without altering the order of the two generated symbols. Further, in this embodiment, an empty symbol position is created for the top symbol position of the reel. In various embodiment, shifting symbols downward to fill one or more empty symbol positions causes a cascading, tumbling, or falling appearance of the symbols in the gaming system, which increases player excitement and enjoyment.

Referring again to FIG. 4B, the gaming system will shift various generated and displayed symbols of reels 54*a*, 54*b*, and 54*c* downward to fill the empty symbol positions 260*a*, 260*b*, 260*c*, 260*d*, and 260*e* on those reels. In the illustrated embodiment, the gaming system will shift the Apple symbol 270*a* and the Wild symbol 210*a* remaining on reel 54*a* downward such that a single empty symbol position will remain on the top row 52*a* of reel 54*a*. The gaming system will also shift each of the symbols of row 52*a* on reels 54*b* and 54*c* (i.e., the Diamond symbol 270*b* of reel 54*b* and the Apple symbol 270*c* of reel 54*c*) downward two symbol positions, such that empty symbol positions remain in rows 52*a* and 52*b* of reels 54*b* and 54*c*.

Figure 4C:
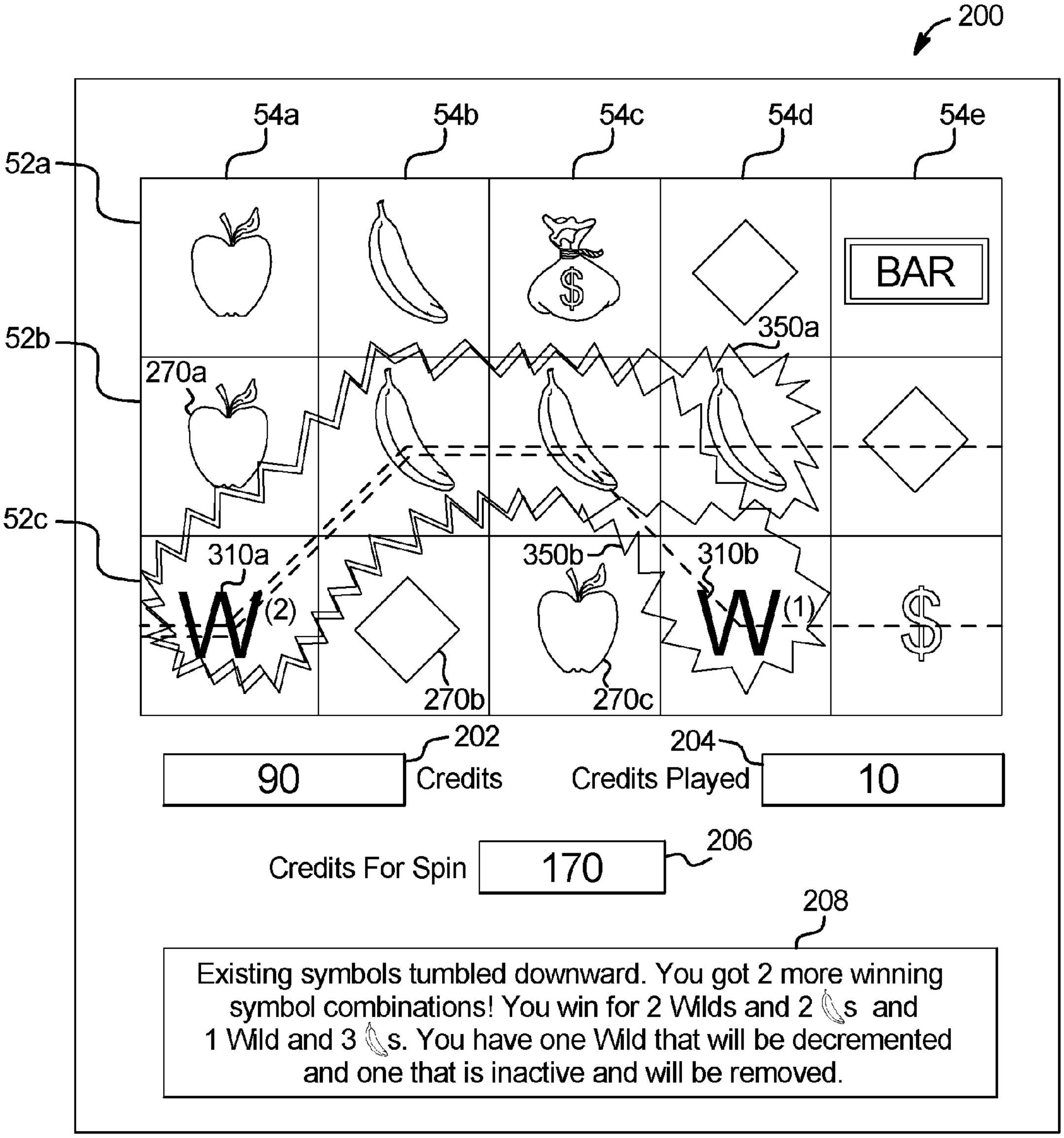

FIG. 4C illustrates the gaming system after the any appropriate symbols are shifted downward and a plurality of new symbols are generated and displayed. In the illustrated embodiment, reel 54*a* includes the shifted Apple symbol 270*a* and the shifted designated Wild symbol 310*a* in rows 52*b* and 52*c*, respectively. Similarly, reel 54*b* includes a shifted Diamond symbol 270*b* in row 52*c*. Reel 54*c* includes a shifted Apple symbol 270*c* in row 52*c*. Game information display area 208 of gaming system 200 in FIG. 4C indicates that the existing symbols were shifted downward.

FIG. 4C also illustrates that the gaming system 200 generates a plurality of symbols and displays them in the empty symbol positions of reels 54*a*, 54*b*, and 54*c* caused by the shifting of the above-noted symbols. It should be appreciated that designated symbols 310*a* and 310*b*, having indicated quantities of two and one, respectively, remain displayed after this shifting and generation, and are available to generate winning symbol combinations.

The gaming system next determines whether any winning symbol combinations are generated for the newly displayed shifted and generated symbols. In the embodiment illustrated by FIG. 4C, the gaming system determines that the generated symbols form two winning symbol combinations 350*a* and 350*b*. Winning symbol combination 350*a* includes three Banana symbols and a designated Wild symbol 310*a* on a payline including a diagonal component and a horizontal component. The gaming system provides an award indicated by one or more paytables associated with the gaming system, the award being based on a winning symbol combination including four Banana symbols. Similarly, winning symbol combination 350*b* includes two Banana symbols and two Wild symbols on a payline including two diagonal components and a horizontal component. Thus, the gaming system provides an award indicated by one or more paytables associated with the gaming system, the award being based on a winning symbol combination including four Banana symbols.

The gaming system indicates the two winning symbol combinations 350*a* and 350*b* in game information display area 208. It should be appreciated that the credits for spin meter 206 represents the total credits won for a play of the game—that is, for any number of generations and displays of one or more symbols. Thus, the gaming system increments the credits for spin meter 206 by 100 credits to a total of 170, representing an award of fifty credits for each of the winning symbol combinations 350*a* and 350*b* and an award of seventy credits for the winning symbol combinations 250*a* and 250*b* of FIG. 4A.

The gaming system 200 is configured to decrement the indicated quantity associated with each displayed designated symbol such as designated Wild symbols 310*a* and 310*b*, as indicated by game information display area 208. Thus, the gaming system decrements the indicated quantity associated with designated Wild symbol 310*a* from two to one (not shown), and decrements the indicated quantity associated with designated Wild symbol 310*b* from one to zero (not shown). Designated Wild symbol 310*a* is still active because its indicated quantity exceeds zero. Thus, the gaming system 200 does not remove designated Wild symbol 310*a*. The indicated quantity associated with designated symbol 310*b* is zero, so the gaming system determines that designated symbol 310*b* is inactive, as indicated by game information display area 208.

Figure 4D:
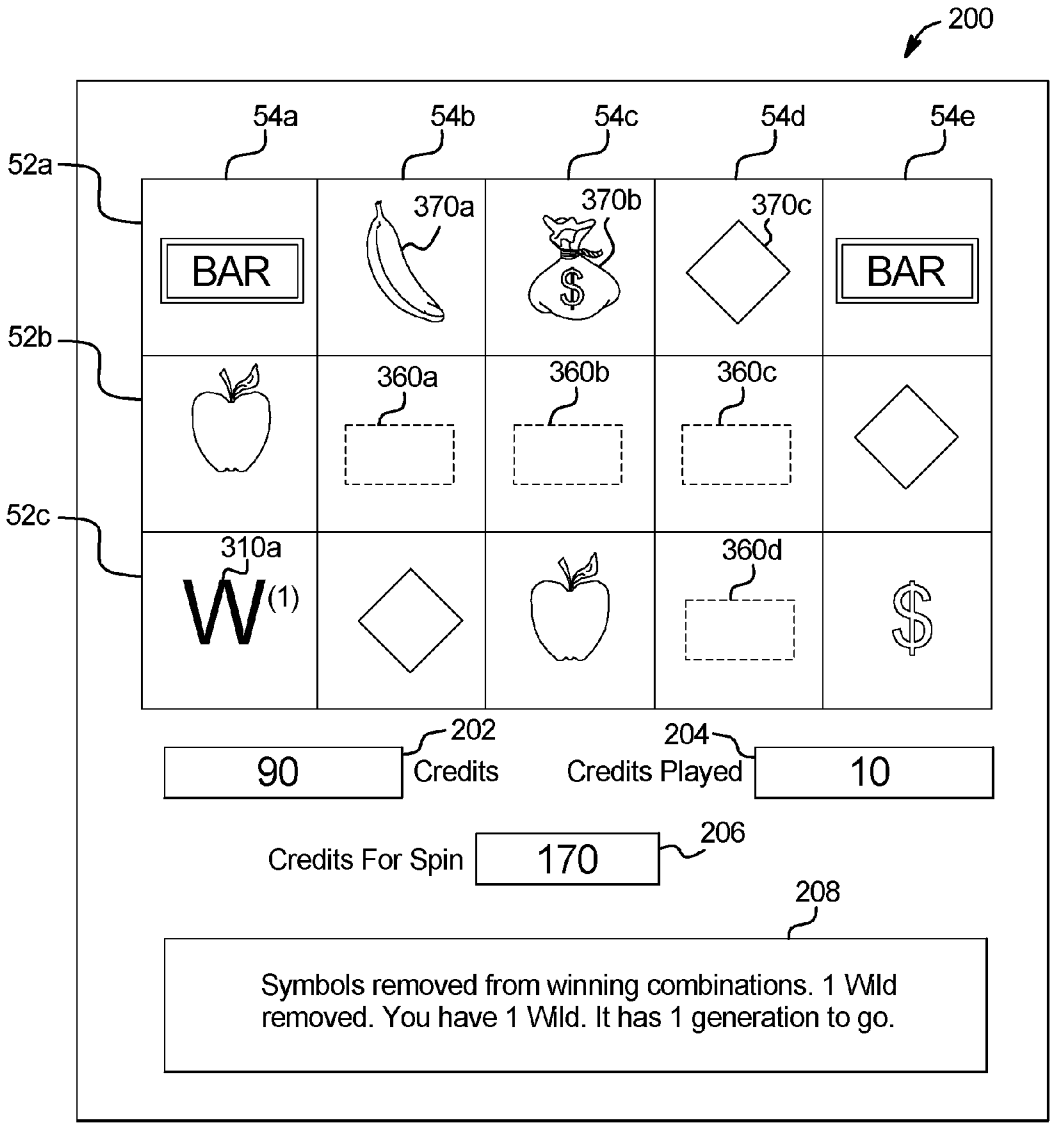

As illustrated by FIG. 4D, the gaming system removes a plurality of symbols from the reels 54*b*, 54*c*, and 54*d*. The gaming system removes each of any non-designated symbols included in the winning symbol combinations 350*a* and 350*b*. In the illustrated embodiment, this results in empty symbol positions 360*a*, 360*b*, and 360*c*. Moreover, the gaming system determines that designated Wild symbol 310*b* is inactive, and thus removes designated Wild symbol 310*b*, resulting in empty symbol position 360*d*. It should be appreciated that the gaming system does not remove designated symbol 310*a* because designated symbol 310*a* remains active (i.e., the indicated quantity is greater than zero). Game information display area 208 indicates that the gaming system removed the non-designated symbols included in the winning symbol combinations and one of the designated Wild symbols. Game information display area 208 also indicates that the remaining designated symbol (i.e., designated symbol 310*a*) will be active for additional generation and display of one or more symbols.

Referring still to FIG. 4D, the gaming system 200 will shift a plurality of symbols of reels 54*b*, 54*c*, and 54*d* to fill one or more of the empty symbol positions 360*a*, 360*b*, 360*c*, or 360*d* of each of these reels. The gaming system will shift the symbol in the top row 52*a* of each of reels 54*b*, 54*c*, and 54*d* downward as far as possible. For reels 54*b* and 54*c*, the gaming system shifts the Banana symbol 370*a* and the Moneybag symbol 370*b*, respectively, down one position. For reel 54*d*, the gaming system shifts the Diamond symbol 370*c* downward two positions until the Diamond symbol 370*c* is displayed in the bottom position of reel 54*d* (i.e., row 52*c*).

Figure 4E:
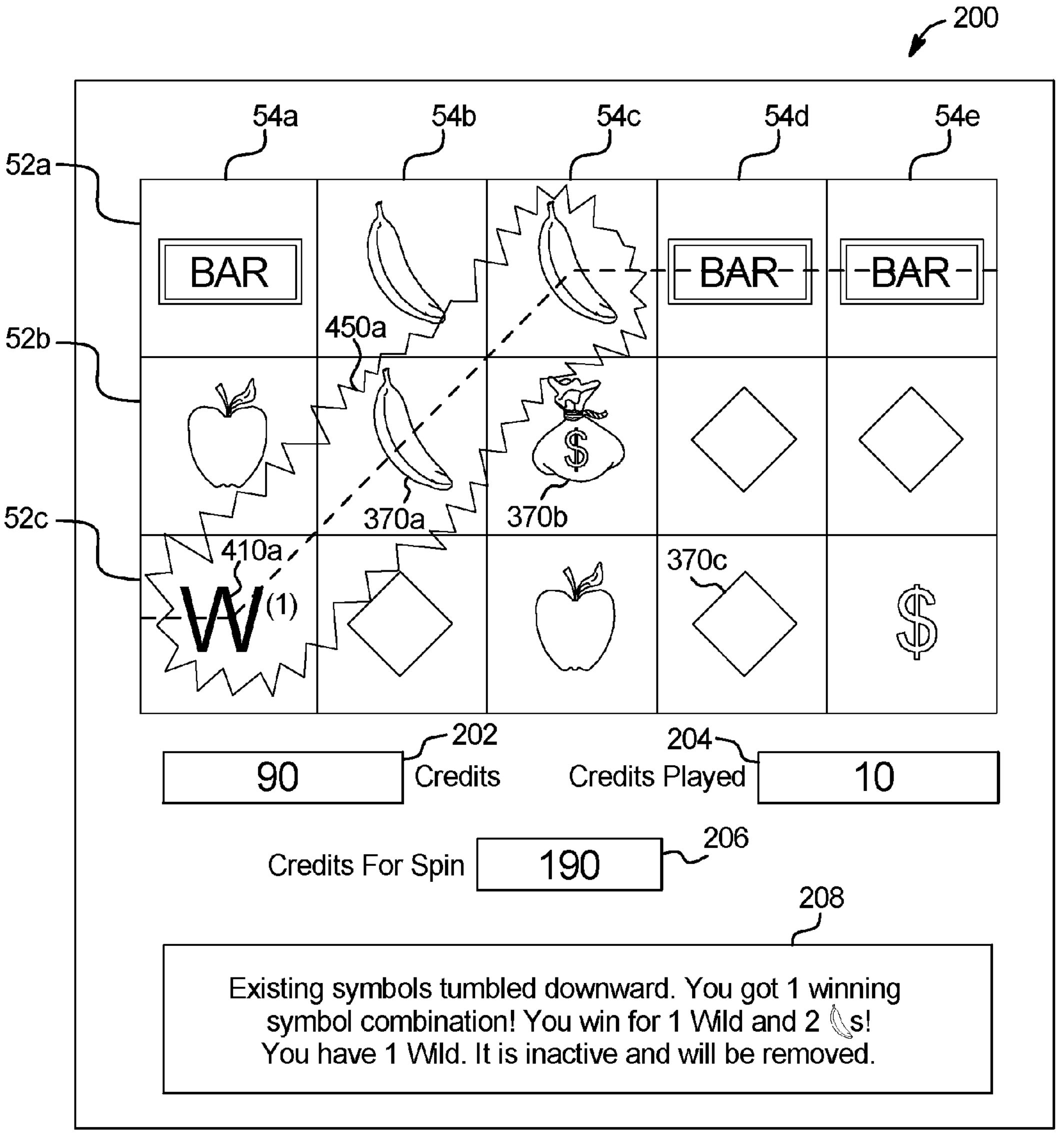

FIG. 4E illustrates gaming system 200 after the gaming system has performed the above-noted tumbling or shifting to fill empty symbol positions 360*a*, 360*b*, 360*c*, and 360*d* of FIG. 4D. As illustrated in FIG. 4E, the gaming system displays only a single designated Wild symbol 410*a* having an indicated quantity of one. Thus, the generation and display of one or more symbols as indicated in FIG. 4E is the last generation for which designated Wild symbol 410*a* is available.

In the illustrated embodiment, the gaming system determines that the symbols displayed in FIG. 4E form one winning symbol combination 450*a*. The winning symbol combination 450*a* includes two Banana symbols and a Wild symbol arranged on a diagonal payline. Since the Wild symbol is treated as a Wild symbol, the gaming system 200 provides an award indicated by at least one paytable associated with the gaming system, the award being based on a winning symbol combination of three Banana symbols. The gaming system increments the credits for spin display area 206 by 20 credits for the winning symbol combination such that the total credits awarded for the spin is one-hundred-ninety. Game information display area 208 also indicates that the gaming system generated a winning symbol combination including three Banana symbols.

In the illustrated embodiment, the gaming system 200 decrements the indicated quantity associated with the single designated symbol 410*a* from one to zero (not shown). Since the gaming system decrements the indicated quantity from one to zero, the gaming system determines that the designated symbol 410*a* is inactive.

Figure 4F:
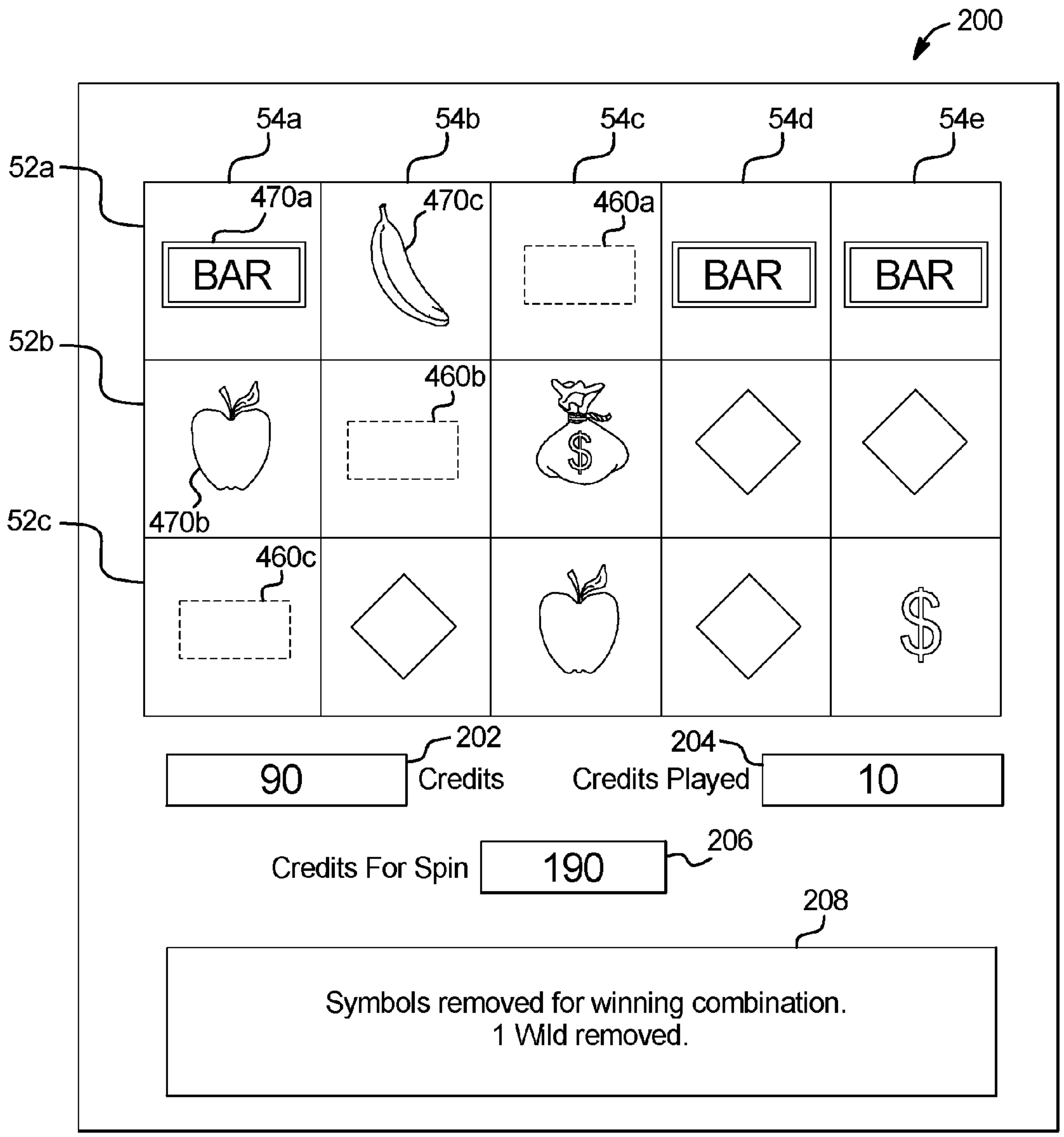

Referring now to FIG. 4F, the gaming system 200 removes the inactive symbol 410*a* and the symbols of winning symbol combination 450*a* from the reels 54*a*, 54*b*, and 54*c*. This removal results in three empty symbol positions 460*a*, 460*b*, and 460*c*. Game information display area 208 indicates that these symbols were removed, and that one of the removed symbols was an inactive designated symbol. In the illustrated embodiment, the gaming system will shift one or more symbols of reels 54*a* and 54*b* downward to fill the empty symbol positions 460*b* and 460*c*. Specifically, the remaining Bar symbol 470*a* and Apple symbol 470*b* of reel 54*a* will each be shifted downward by one symbol position to fill empty symbol position 460*c*. The Banana symbol 470*c* of the top symbol position in row 52*a* of reel 54*b* will be shifted downward by one symbol position to fill empty symbol position 460*b*. Since the gaming system does not display a generated symbol above empty symbol position 460*a*, the gaming system will not shift the symbols of reel 54*c*. It should be appreciated that the top symbol position (i.e., the symbol position of row 52*a*) will be empty for each of reels 54*a*, 54*b*, and 54*c* after shifting. Game information display area 208 indicates that the gaming system removed the symbols of the winning symbol combination 450*a* and the inactive designated Wild symbol 410*a*.

Figure 4G:
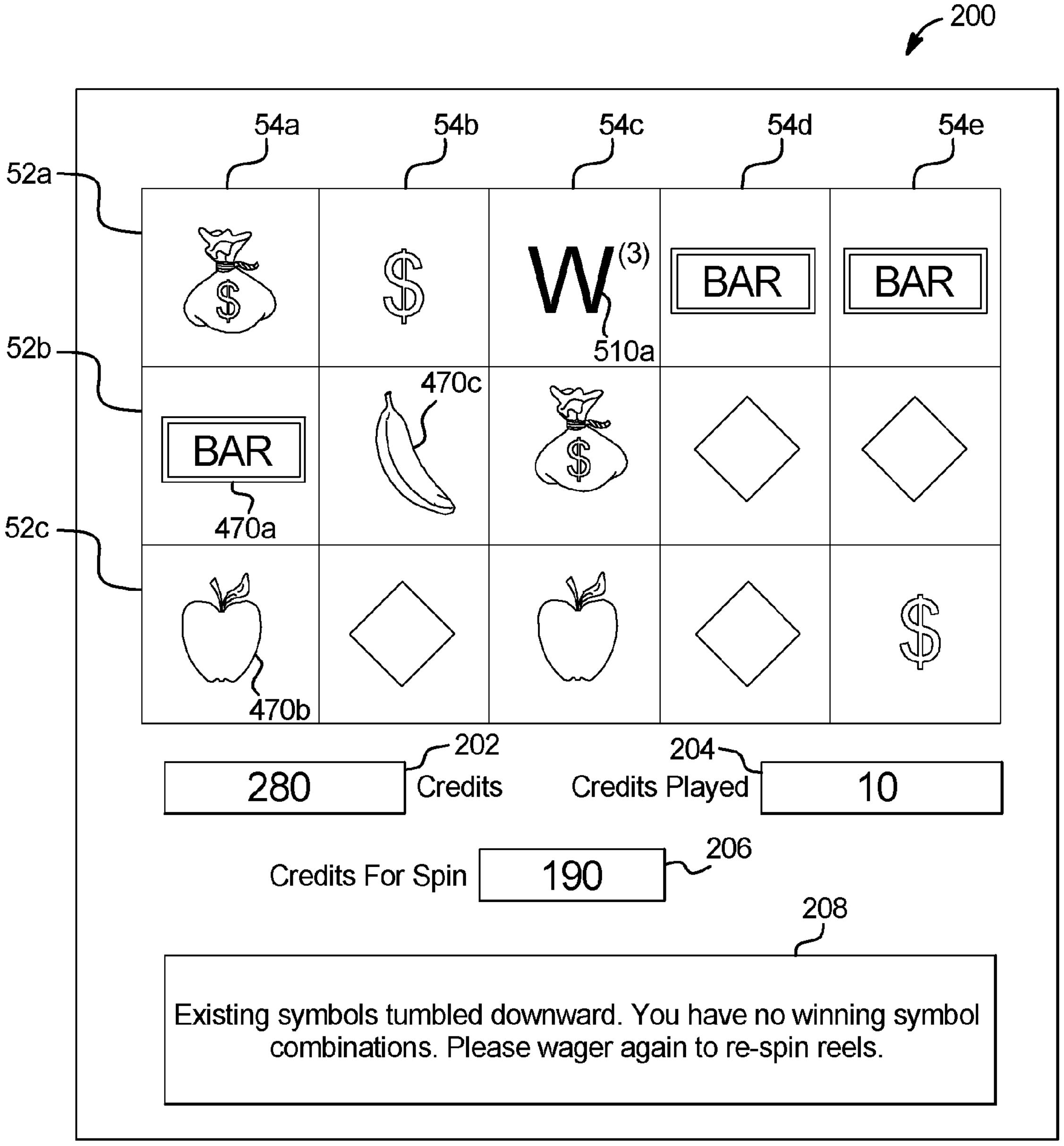

FIG. 4G illustrates the reels of gaming system 200 after shifting the symbols as described above and generating and displaying three new symbols to fill the three empty symbol positions 460*a*, 460*b*, and 460*c* of FIG. 4F. In the illustrated embodiment, one of the new symbols is a designated (i.e., Wild) symbol 510*a* with an indicated quantity of three. It should be appreciated that designated symbol 510*a* is configured to be available for use in a winning symbol combination for three generations of symbols.

In the illustrated embodiment, the gaming system 200 does not generate any winning symbol combination for the displayed symbols, as indicated by game information display area 208. Therefore, the gaming system provides the total award indicated by the credits for spin display area 206. In the illustrated embodiment, the gaming system adds an award of one-hundred-ninety credits to the accumulated credits of 90. The player of the gaming system 200 illustrated in FIG. 4G has thus accumulated a total of 280 credits. As indicated by game information display area 208, the player may wager some of any remaining credits on a second play of the game.

It should be appreciated that FIGS. 4A to 4G illustrate a play of the game. In the illustrated embodiment, the gaming system provides an award of one-hundred-ninety credits for a single wager on a play of the game. It should be further appreciated that the FIGS. 4A to 4G illustrate four different generations and displays of one or more symbols (i.e., FIGS. 4A, 4C, 4E, and 4G).

In one embodiment, the gaming system functions as disclosed above with the exception that it changes the indicated quantity by increasing the indicated quantity until a threshold indicated quantity is reached. In one embodiment, upon reaching this threshold, the gaming system removes the designated symbol with which the indicated quantity is associated. For example, for a gaming system with a threshold of two, the gaming system may generate a designated symbol having an indicated quantity of zero. In one embodiment, the gaming system changes the indicated quantity of the designated symbol from zero to one regardless of whether the designated symbol is included in any winning symbol combination. Since the threshold (i.e., two) has not been met, the gaming system does not remove the designated symbol. If the gaming system removes one or more symbols, the gaming system in one embodiment again increments the indicated quantity of the designated symbol for a second determination of whether any winning symbol combinations are displayed. In this embodiment, if the indicated quantity after so incrementing is equal to the threshold quantity (i.e., two), the gaming system determines that the designated symbol is inactive and removes the designated symbol. It should be appreciated that in one embodiment, the gaming system increases the indicated quantity, though it displays a representation of a decreasing or diminishing indicated quantity as discussed elsewhere herein, such as a symbol which fades from black to white, to a player at a gaming device.

In various embodiments, the designated symbol is a symbol other than a Wild symbol, such as a symbol usable to generate the winning symbol combination associated with the largest available award of the gaming system. In one example embodiment, a winning symbol combination of three Jackpot symbols results in the gaming system providing the largest possible award to the player. In this example embodiment, the gaming system assigns an indicated quantity to one or more of the Jackpot symbols, such that one or more of the Jackpot symbols may be available to form winning symbol combinations (i.e., to potentially form the combination associated with the largest possible award) for more than one generation and display.

In another embodiment, the gaming system is configured to remove one or more designated symbols even if the gaming system did not generate a winning symbol combination for a generation and display of one or more symbols. In this embodiment, removing any generated designated symbol provides an opportunity to potentially shift and/or replace one or more symbols to generate a winning symbol combination, even in the absence of any winning symbol combinations. In the embodiment illustrated in FIG. 4G, for example, the gaming system may remove the Wild symbol 510*a* and replace it with a generated symbol from the plurality of symbols. It should be appreciated that in the illustrated embodiment, unless the gaming system is configured to provide one or awards based on a scatter pay configuration, no symbol which the gaming device could generate and display can result in a winning symbol combination.

In one embodiment, the gaming system is configured to provide one or more awards for a play of the game for a winning combination of symbols based on a scatter pay configuration. In another embodiment, the gaming system provides an award for a scatter pay configuration of designated symbols whose indicated quantities together satisfy a winning criterion. In this embodiment, the gaming system provides an award for a scatter pay combination including designated symbols whose indicated quantities add up to a number greater than five. In this embodiment, if a play of the game results in the generation and display of three designated symbols having indicated quantities of three, two, and one, respectively, the gaming system provides an award for a scatter pay configuration of the designated symbols having indicated quantities with a sum of six. In one embodiment, the gaming system provides one or more awards for such a scatter pay configuration in addition to any awards provided for winning symbol combinations arranged along one of a plurality of paylines.

In various embodiments, the gaming system generates and displays a symbol in each of any empty symbol positions from a plurality of symbols. In various embodiments, the plurality of symbols includes more than one designated symbol. In one embodiment, each of a plurality of designated symbols is displayed as a different symbol or indicia. In this embodiment, each of the designated symbols of the plurality of designated symbols has a predefined indicated quantity. In one embodiment, a plurality of symbols includes three designated symbols including a bar, a double bar, and a triple bar symbol. In this embodiment, the bar symbol has an indicated quantity of one, the double bar symbol has an indicated quantity of two, and the triple bar has an indicated quantity of three.

In one embodiment, the designated symbol is associated with a plurality of indicia which represent a quantity of generations and displays for which the designated symbol will remain active. In one embodiment, a designated symbol displayed as a large W symbol includes a quantity of W indicia stacked on top of each other, wherein each W indicia is a different color, size, shape, or has another appropriate differentiating characteristic. In this embodiment, the quantity of stacked W indicia represents the indicated quantity associated with the designated symbol. In one such embodiment, the gaming system does not display an indicated quantity as a numeral associated with each designated symbol. In one embodiment, an indicated quantity associated with three for the designated symbol is displayed as a stack large W symbol including three W indicia. In this embodiment, if the indicated quantity is decremented from three to two (not shown), one of the stacked W indicia is removed from the designated W symbol. When the indicated quantity is decremented to zero, the gaming system displays an empty symbol position (i.e., each W indicia of the large W symbol was removed) to indicate that the designated symbol has expired or become inactive.

In one embodiment, the gaming system displays a change of the indicated quantity of a designated symbol by changing the displayed designated symbol. In one embodiment, the gaming system displays a designated symbol as a single Bar symbol for a play of the game. As the indicated quantity changes, the gaming system changes the single Bar symbol to a double Bar symbol, then to a triple Bar symbol. In one such embodiment, changing the symbol changes the potential winning symbol combinations which can be formed. In one embodiment, by changing a single Bar symbol to a double Bar symbol, the gaming system provides an increased award for a winning symbol combination including the double Bar symbol based on a paytable in which combinations including a double Bar symbol have higher award values than combinations including a single Bar symbol. It should be appreciated that as the indicated quantity changes, the values of potentially available winning symbol combinations may also change.

In one embodiment, whether the designated symbol is active or inactive is determined based, at least in part, on the position of the symbol. In one such embodiment, no designated symbol is active for more than one generation of one or more symbols if the designated symbol is in the bottom symbol position of a column of a matrix of symbols, illustrated as a reel. In one embodiment, the gaming system determines whether a designated symbol is active or inactive based, at least in part, on a number of winning symbol combinations of which the designated Symbol has been a part. IN an example embodiment, a designated symbol automatically becomes inactive, regardless of an associated value, after the designated symbol has been included in two or more winning symbol combinations. In various embodiments, whether a designated symbol is active or inactive is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, each designated symbol is on one of a plurality of reel strips and includes a predefined indicated quantity. In other embodiments, the gaming system determines the indicated quantity associated with one or more designated symbols at the time the designated symbol is generated. In various such embodiments, the indicated quantity is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In certain embodiments, the probability of generating a designated symbol varies. For example, in one such embodiment, a designated symbol represents a relatively rare, relatively valuable symbol because an occurrence of a designated symbol provides a Wild symbol for use in more than one generation of symbols. In this embodiment, the probability of generating a Wild symbol is relatively low. In one embodiment, the gaming system is configured to generated a designated symbol relatively frequently, but to provide relatively small awards for winning symbol combinations including the designated symbol. In this embodiment, the probability of generating a designated symbol is relatively higher.

In one embodiment, it is relatively unlikely that the gaming system will generate a relatively high indicated quantity for a generated designated symbol. Thus, if a designated symbol is generated, it is more likely that the designated symbol will only remain active for a relatively small quantity of generations and displays of one or more symbols. In various embodiments, the probability of generating a designated symbol and the probability of generating a relatively high associated value for any generated designated symbol vary depending on one or more payouts provided by the gaming system. In alternative embodiments, the probability of generating a designated symbol is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In alternative embodiments, one or more of the designated symbols is not configured to function as a Wild symbol for purposes of determining winning symbol combinations. In one such embodiment, the gaming system is configured to modify an award for a winning symbol combination if the winning symbol combination includes the designated symbol. In various embodiments, the gaming system modifies an award resulting from such a winning symbol combination by adding a predefined number of credits or multiplying the award by a multiplier.

In various embodiments, the gaming system decrements the quantity of one or more generated designated symbols by a number different from one for one or more generations of one or more symbols. In one embodiment, the gaming system only decrements the indicated quantity associated with a designated symbol if the designated symbol is included in a generated winning symbol combination. In one embodiment, the gaming system decrements the indicated quantity associated with a designated symbol for one or more generations of one or more symbols. In one embodiment, the indicated quantity associated with a designated symbol is decremented by a number different than one, such as by a random number, for one or more generations of one or more symbols. In one embodiment, the gaming system decrements the indicated quantity associated with a designated symbol by one for each winning symbol combination of which the designated symbol is a part. For example, if the gaming system determines that a given designated symbol is included in two winning symbol combinations for a single generation of one or more symbols, the gaming system in one embodiment decrements the indicated quantity associated with the designated symbol by two. In one embodiment, the indicated quantity associated with a designated symbol is incremented. In a further embodiment, the indicated quantity associated with a designated symbol is incremented if the designated symbol is included in more than one winning symbol combination for a given generation and display of one or more symbols. In various embodiments, the quantity by which to decrement an indicated quantity is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system decrements the indicated quantity of a designated symbol based on a number of winning symbol combinations of which the designated symbol is a part. In one such embodiment, if a designated symbol is included in only one winning symbol combination, the gaming system decrements the indicated quantity by one. Alternatively, if a designated symbol is included in two different winning symbol combinations, the gaming system decrements the indicated quantity by two.

In various alternative embodiments, the gaming system decrements the indicated quantity of a designated symbol if it is part of only a single winning combination, but does not decrement the indicated quantity if the designated symbol is part of more than one winning symbol combinations. In one such embodiment, the gaming system does not change the indicated quantity of a designated symbol which is part of more than one winning symbol combination. In another such embodiment, the gaming system increments the indicated quantity of a designated symbol which is part of more than one winning symbol combination. It should be appreciated that in these embodiments, if the gaming system determines that the same designated symbol is used to form more than one winning symbol combination, the gaming system is configured to enable that designated symbol to potentially be used to form winning symbol combinations for more generations and displays than if the gaming system had used that designated symbol to form only a single winning symbol combination.

In one embodiment, the gaming system is configured to remove at least one but less than all the symbols of a winning symbol combination for a generation and display of one or more symbols. In one embodiment, the gaming system is configured to remove at least one but less than all the symbols not included in a winning symbol combination for a generation and display of one or more symbols. In various embodiments, the symbols to be removed are predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system is configured to shift each of any remaining symbols to one or more empty symbol positions so long as shifting that symbol in a given direction will fill the empty symbol position. For example, if the gaming system is configured to shift one or more symbols downward, the gaming system will shift any generated symbol displayed above an empty symbol position. In this embodiment, if one of any empty symbol positions is displayed such that no symbol is displayed in a symbol position above the empty symbol position, that empty symbol position cannot be filled by shifting. In various embodiments, the gaming system disclosed herein is configure to shift any symbol which can be shifted to fill an empty symbol position created by a previous removal or shifting of one or more symbols.

In various embodiments, for one or more empty symbol positions resulting from the gaming system removing one or more displayed symbols (such as a designated symbol), the gaming system disclosed herein shifts one or more displayed symbols to fill the empty symbol position(s). In various embodiments, the gaming system shifts the one or more symbols downward (i.e., tumbling), upwards (i.e., climbing), or laterally (i.e., crawling). or diagonally. In various embodiments, the direction of any shifting is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system shifts one or more but less than all symbols displayed adjacent to an empty symbol position. In one such embodiment, the gaming system enables the player to determine one or more designated symbols to shift. In another such embodiment, the gaming system enables the player to determine one or more directions to shift one or more designated symbols. In various embodiments the number of symbols to shift is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system is configured to reconstitute the matrix of symbol positions after each shift. In this embodiment, for each set of symbols shifted into one or more empty symbol positions, the gaming system generates and displays new symbols in the empty symbol positions created by any shifting. Thus, for each shift of one or more symbols, the gaming system provides the player with an opportunity to win again based on a full matrix of symbol positions.

In another embodiment, the gaming system does not reconstitute the matrix of symbol positions after each shift. In this embodiment, the gaming system shifts the one or more symbols according to the appropriate set of game rules, determines whether any winning symbol combinations are displayed, provides an award, and repeats. It should be appreciated that in this embodiment, the gaming system does not generate and display additional symbols to fill any empty symbol positions caused by shifting one or more of the remaining symbols.

In still another embodiment, the gaming system does not reconstitute the matrix of symbol positions until all possible awards are provided without reconstitution. In this embodiment, the gaming system removes any appropriate symbols from any determined winning symbol combinations, shifts symbols according to the applicable game rules, and determines whether any winning symbol combinations are generated. The gaming system then removes any symbols from any winning symbol combinations and repeats the shifting. If the shifting does not result in any winning symbol combinations, the gaming system in this embodiment reconstitutes the matrix of symbol positions by generating and displaying a symbol in each empty symbol position.

In various alternative embodiments, the award provided for the play of the game is based on an award provided for each of any generated winning symbol combinations. In one embodiment, the total award provided for a play of the game is the sum of the awards for each generated winning symbol combination for each generation and display of one or more symbols. In another embodiment, the total award provided for the play of the game is based on the sum of the awards for each generated winning symbol combination, but is also based on the number of generations and displays for a play of the game. In one embodiment, the total award is the sum of the awards for the winning symbol combinations multiplied by the number of generations and displays of one or more symbols. In one embodiment, the total award is also based on a number of designated symbols such as a quantity of designated symbols used to form winning symbol combinations for a play of the game.

In one embodiment, any award provided for a play of the game of the disclosed gaming system is based on the indicated quantity associated with a designated symbol included in the winning symbol combination resulting in the award. In one embodiment, the gaming system treats the indicated quantity as a multiplier, and any award indicated on a paytable for a winning combination of symbols is multiplied by the indicated quantity of a designated symbol of the winning combination of symbols. In a further embodiment, if more than one designated symbol is included in a winning symbol combination, the gaming system modifies the award indicated in the paytable by each indicated quantity. In one embodiment, if a winning symbol combination includes a first designated symbol with an indicated quantity of three and a second designated symbol with an indicated quantity of two, the gaming system multiplies an award indicated in a paytable as associated with the winning symbol combination which includes such symbols by six to determine the award provided to the player. In another embodiment, the gaming system multiplies the award indicated in a paytable as associated with the winning symbol combination which includes such symbols by the sum of the indicated quantities of designated symbols of the winning symbol combination, such as by multiplying the award indicated in the paytable by five (i.e., three plus two) in the example given above.

In one embodiment, wherein the gaming system disclosed herein is configured to generate a symbol in each of a plurality of symbol positions from a plurality of symbols, the plurality of symbols including at least one designated symbol, the disclosed game is more likely to display one or more of these designated symbols in the lower portions of the displayed reels. In one such embodiment, where a designated symbol is associated with an indicated quantity which indicates a number of generations and displays of one or more symbols for which the designated symbol remains active, a designated symbol is likely to shift downward and be displayed in a position low on one of the plurality of reels. Since this likelihood is present for each of the plurality of reels, the gaming system is more likely to generate and display more valuable winning symbol combinations and/or winning symbol combinations including relatively more symbols. It should be appreciated that this increased likelihood of generating combinations that are less likely to occur in one embodiment results in larger awards and therefore more excitement and enjoyment for a player of the disclosed gaming system.

In one embodiment, the gaming system disclosed herein generates a winning symbol combination including only wild symbols. In one such embodiment, for a gaming system displaying five columns of a matrix of symbols, displayed as five reels, the gaming system generates a winning symbol combination including five Wild symbols. In one such embodiment, the gaming device provides an award for the initial winning combination of symbols. In this embodiment, if no other winning symbol combinations are generated (i.e., no non-designated symbols are removed), the gaming system decrements the quantity of each Wild symbol in the winning combination, removes any inactive Wild symbols, and provides an award for any resulting winning symbol combinations. It should be appreciated that if a winning combination of Wild symbols is generated wherein the indicated quantity associated with each Wild symbol exceeds one, the gaming system may decrement each indicated quantity without removing any of the designated Wild symbols.

In various embodiments, the gaming system disclosed herein is configured to generate and display one or more designated symbols as overlaying one or more non-designated symbols. In these embodiments, the gaming system treats the designated symbol(s) as described above—that is, the gaming system decrements an indicated quantity until the designated symbol expires. In these embodiments, upon the expiration of any designated symbol, the gaming system removes the designated symbol but does not display an empty symbol position. Rather, the gaming system displays the underlying non-designated symbol and potentially uses the underlying symbol to generate one or more additional winning symbol combinations.

In one embodiment, the gaming system is configured to shift each symbol, with the exception of one or more designated symbols, according to an applicable set of game rules. In this embodiment, if the game rules indicate that the gaming device will shift symbols downward to fill empty symbol positions, the gaming system will not shift one or more designated symbols downward even if an empty symbol position is displayed below the one or more designated symbols. In a further embodiment, the gaming system is configured to shift non-designated symbols downward as far as possible such that the non-designated symbols shift through, over, or otherwise past a non-shifting designated symbol. In one embodiment, the gaming system is configured to shift non-designated symbols only as far as possible without bypassing one or more non-shifting designated symbols.

In one embodiment, the gaming system disclosed herein generates only the non-designated symbols used during a play of the game. In this embodiment, the gaming system generates each non-designated symbol generated for a play of the game, analyzes any awards to be provided, and shifts the symbols as disclosed. In this embodiment, a remotely located controller (e.g., a remotely located central server) generates any designated symbols used during the play of the game. Thus, the remotely located central server determines when to provide one or more designated symbols for the play of the game of a gaming system as disclosed herein. The remotely located central server in one embodiment also determines the indicated quantity associated with each generated designated symbol.

In one embodiment, a designated event occurs (e.g., an event which causes the generation of designated symbols) based on one or more game play events, such as a symbol-driven trigger. In other embodiments, the designated event occurs based on exceeding a certain amount of game play (such as number of games, number of credits, or elapsed amount of time), or based on reaching a specified number of points earned during game play.

In another such embodiment, the designated event occurs (e.g., to cause the generation of designated symbols) based on a random trigger or on an apparently random trigger. In one such embodiment, the gaming system does not provide any apparent reasons to the player for the occurrence of the designated event, wherein the designated event is not based on any event in any of the plays of any primary games or on any of the plays of any secondary game of the gaming system. That is, the designated event occurs without any explanation or alternatively with simple explanations. In another embodiment, the designated event occurs at least partially based on a game event, such as a symbol-driven trigger, and at least partially based on a non-game play event, such as a random event.

In one such embodiment, the occurrence of the designated event (e.g., to cause the generation of designated symbols) is randomly determined, wherein different players are assigned different chances of obtaining a designated event based on their respective wager levels. For example, if a first player wagered 500 coins and a second player wagered 225 coins and the chance of obtaining the designated event was 1/20,000, the first player would have a 2.5% (500/20,000) chance of obtaining the designated event for the first player while the second player would have a 1.125% (225/20,000) chance of obtaining the designated event for the second player.

In one such embodiment, the designated event occurs (e.g., to cause the generation of designated symbols) based on at least one accumulated value progressive award incremented to a progressive award hit value. In this embodiment, the gaming system includes one or more accumulated value progressive awards or Nth coin progressive awards. Such accumulated value progressive awards are driven by an amount of wagers placed or a suitable coin-in amount. In one such embodiment, each accumulated value progressive award is associated with a range of values, wherein a designated event will occur when the progressive award increments to a progressive award hit value within the range of values associated with that progressive award. That is, when an accumulated value progressive award increases to a determined progressive award hit value, a designated event will occur. In different embodiments, the progressive award hit value at which an accumulated value progressive award causes a designated event to occur is predetermined, randomly determined, determined based on the wagers placed in the gaming system, determined based on the status of one or more players (such as determined through a player tracking system), determined based on time, or determined based on any other suitable method. In this embodiment, after the accumulated value progressive award causes a designated event to occur, the accumulated value progressive award is reset to a default value and starts incrementing from the default progressive award level.

In operation of one such embodiment, the remote central server which hosts one of these accumulated value progressive awards: (1) determines a minimum amount and a maximum amount for the progressive award or prize pool, (2) provides that the progressive award or prize pool starts at the minimum, (3) determines an accumulated value progressive award hit value between the minimum amount and the maximum amount, (4) increments the progressive award or prize pool with a configured percent of coin-in, and (5) causes a designated event to occur when the progressive award or prize pool equals the determined accumulated value progressive award hit value. In this embodiment, the accumulated value progressive award hit value is determined at random to maintain fairness for the players of the gaming system, wherein the players are not aware of any determined accumulated value progressive award hit value.

In different embodiments, the range of values associated with an accumulated value progressive award is predetermined, randomly determined, determined based on the wagers placed in the gaming system, determined based on the status of one or more players (such as determined through a player tracking system), determined based on time, or determined based on any other suitable method. In one embodiment, a plurality of accumulated value progressive awards are associated with different value ranges. In another embodiment, each of a plurality of accumulated value progressive awards are associated with a different value range. In another embodiment, a plurality of accumulated value progressive awards are associated with the same value range. In another embodiment, the value range associated with an accumulated value progressive award is based on a player's status (via a player tracking system).

In another such embodiment, the designated event occurs (e.g., to cause the generation of designated symbols) based on time. In this embodiment, a time is set for when a designated event will occur. In one embodiment, such a set time is based on historic data. In one such example embodiment, if previous designated events have occurred after approximately thirty-seven minutes, a designated event is set to trigger thirty-seven minutes from the conclusion of the previous designated event. In one embodiment, a suitable algorithm is implemented to determine the player who wagered at or closest to this time with tie-breaking based on any number of factors (e.g., player tracking history, amount of or recent wagers placed).

In another such embodiment, the designated event occurs (e.g., to cause the generation of designated symbols) based on a predefined variable reaching a defined parameter threshold. For example, the designated event occurs when the 500th different player has played the gaming system associated with the designated event (ascertained from a player tracking system). In different embodiments, the predefined parameter thresholds include a length of time, a length of time after a certain dollar amount is hit, a wager level threshold for the gaming system (which gaming device is the first to contribute $250,000), a number of gaming machines in the gaming system active, or any other parameter that would define a threshold for the occurrence of the designated event.

In another such embodiment, the designated event occurs (e.g., to cause the generation of designated symbols) after a random number of plays in which a designated event has not occurred. In another embodiment, the occurrence of the designated event is based upon gaming system operator defined player eligibility parameters stored on a player tracking system (such as via a player tracking card or other suitable manner). In another embodiment, the occurrence of the designated event is based upon gaming system operator defined player eligibility parameters stored on a player tracking system (such as via a player tracking card or other suitable manner).

In another such embodiment, the occurrence of the designated event (e.g., to cause the generation of designated symbols) includes a system determination which is based on a random selection by the central controller. In one embodiment, the central controller tracks all active gaming systems and the wagers they placed. Each gaming system has its own entry defining its state as either active or inactive and also defining the values of the wagers from that gaming system. In one embodiment, active status means that the gaming system is being actively played by a player and enrolled/inactive status means that the gaming system is not being actively played by a player. The active status requirements can be based on any suitable number of satisfied criteria or defined in any suitable manner by the implementer of the gaming system. In one embodiment, a play of or wager on the primary game of the gaming system within a predetermined period of time is part of the determination of whether that gaming system is in the active status. Other factors such as: (a) the amount of time between each play of or wager on the primary game of the gaming system; (b) the amount being wagered on the primary game(s); and (c) the number of plays within a period of time, may also or alternatively be part of the determination of whether a gaming system is in the active status; (d) the existence of credits on the gaming system may also or alternatively be part of the determination of whether a gaming system is in the active status.

In one alternative embodiment, a central controller and a gaming system work in conjunction with each other to determine when the designated event will occur. In one embodiment, the gaming system determines when to cause one or more designated events to occur. In another embodiment, the gaming system determines when to cause at least one designated event to occur and the central controller determines when to cause at least one designated event to occur.

In another embodiment, the central controller determines, in cooperation with the gaming system, when to cause a designated event to occur by utilizing one or more random number generators. In this embodiment, the central controller determines when to cause the designated event to occur by determining if any numbers allotted to a gaming system match a randomly selected number. In one such embodiment, upon or prior to each play of the game, a random number is selected from a range of numbers and during each primary game, the gaming system allocates the first N numbers in the range, where N is the number of credits bet by the player in that primary game. At the end of the primary game, the randomly selected number is compared with the numbers allocated to the player and if a match occurs, the gaming system causes a designated event to occur. It should be appreciated that any suitable manner of causing the designated event to occur may be implemented with the gaming system disclosed herein.

In one embodiment, the gaming system disclosed herein enables a player to save one or more designated symbols generated during a play of the primary game. By using an appropriate player tracking system such as a player tracking system implemented with a plurality of player tracking cards, the gaming system enables a player to save one or more designated symbols for use during a future play of the game. In various embodiments, the gaming system enables the player to save the designated symbols, the indicated quantities, the positions of the designated symbols, and/or one or more empty symbol positions.

In one embodiment, wherein the gaming system enables the player to save one or more designated symbols for use during a later play of the game, the designated symbols are saved for later use in the same game or saved for use in a play of a different game. In one alternative embodiment, the gaming system does not enable the player to save any remaining designated symbols for use in a later or different game. In one embodiment, the gaming system enables any remaining designated symbols to be saved for a designated period of time (or a designated quantity of games played) and then if unused, any saved designated symbols expire. In such embodiments, any remaining designated symbols are saved in association with a player tracking system, in association with the central server and/or in association with the individual gaming devices.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device, at least one input device, at least one processor, and at least one memory device which stores a plurality of instructions, which when executed by the at least one processor, cause the at least one processor to operate with the at least one display device and the at least one input device, for a play of a game, to:

(a) generate and display one of a plurality of symbols in each of a plurality of symbol positions, said plurality of symbols including:

(i) at least one active designated symbol, said at least one active designated symbol being associated with an initial indicated numeric quantity of generations said symbol will remain active, said initial indicated numeric quantity being greater than one, and (ii) at least one non-designated symbol, said at least one non-designated symbol not being associated with any indicated numeric quantity;

(b) determine whether any winning symbol combinations are generated and displayed;

(c) for each generated symbol, determine said generated symbol as one of: any designated symbols and any non-designated symbols;

(d) for each of any generated winning symbol combinations:

(i) cause an award to be displayed based on said generated winning symbol combination, and (ii) remove at least one of any determined non-designated symbols of said generated winning symbol combination, each of said removed, non-designated symbols resulting in a displayed empty symbol position;

(e) for at least one of any determined generated designated symbols:

(i) modify the indicated numeric quantity associated with said generated designated symbol, (ii) determine whether said designated symbol is inactive, said determination being based, at least in part, on the modified indicated numeric quantity associated with said designated symbol, (iii) if said designated symbol is determined to be inactive, remove said inactive designated symbol, said removal resulting in a displayed empty symbol position, and (iv) if said designated symbol is determined to be active, continue displaying said active designated symbol; and (f) if any empty symbol position is displayed:

(i) reposition zero, one, or more of said generated symbols to zero, one, or more of the empty symbol positions to create zero, one, or more empty symbol positions, (ii) generate and display one of the plurality of symbols in each of any displayed empty symbol positions, and (iii) repeat (b) to (ef).

2. The gaming system of claim 1, wherein the at least one designated symbol is a wild symbol.

3. The gaming system of claim 1, wherein the instructions cause the at least one processor to determine the indicated numeric quantity associated with the at least one generated designated symbol based on one of the following: a random determination, a predefined quantity, and any previous indicated numeric quantity.

4. The gaming system of claim 1, wherein the instructions cause the at least one processor to change the indicated numeric quantity associated with at least one of any generated designated symbols by decrementing the indicated numeric quantity.

5. The gaming system of claim 4, wherein the instructions cause the at least one processor to change the indicated numeric quantity associated with at least one of any generated designated symbols by decrementing the indicated numeric quantity by a predefined quantity.

6. The gaming system of claim 1, wherein the instructions cause the at least one processor to change the indicated numeric quantity associated with each of any generated designated symbols which is part of at least one winning symbol combination.

7. The gaming system of claim 6, wherein the instructions cause the at least one processor to change the indicated numeric quantity associated with each of any generated designated symbols based on a quantity of winning symbol combinations of which said designated symbol is a part.

8. The gaming system of claim 1, wherein the instructions cause the at least one processor to determine whether at least one of any generated designated symbols is active based on whether the indicated numeric quantity exceeds a predefined indicated numeric quantity.

9. The gaming system of claim 8, wherein the predefined indicated numeric quantity is zero.

10. A gaming system comprising:

at least one display device, at least one input device, at least one processor, and at least one memory device which stores a plurality of instructions, which when executed by the at least one processor, cause the at least one processor to operate with the at least one display device and the at least one input device, for a play of a game to:

(a) generate and display one of a plurality of symbols in each of a plurality of symbol positions, said plurality of symbols including:

(i) at least one designated symbol, said at least one designated symbol being associated with an initial indicated numeric quantity of generations said symbol will continue to be displayed if initially generated, said initial indicated numeric quantity being greater than one, and (ii) at least one non-designated symbol, said at least one non-designated symbol not being associated with any indicated numeric quantity;

(b) determine whether any winning symbol combinations are generated and displayed;

(c) for each generated symbol, determine said generated symbol as one of: any designated symbols and any non-designated symbols;

(d) remove at least one of any determined non-designated symbols included in each of any generated winning symbol combinations, each of any removed non-designated symbols resulting in an empty symbol position;

(e) for at least one of any determined generated designated symbols:

(i) modify the indicated numeric quantity associated with said generated designated symbol, (ii) remove said designated symbol if the modified indicated numeric quantity associated with said designated symbol is equal to a predefined indicated numeric quantity, said removal resulting in an empty symbol position, and (iii) continue displaying said designated symbol if the modified indicated numeric quantity associated with said designated symbol exceeds a predefined indicated numeric quantity;

(f) if any empty symbol position is displayed:

(i) reposition zero, one, or more of said generated symbols to zero, one, or more of the empty symbol positions to create zero, one, or more empty symbol positions, (ii) generate and display one of the plurality of symbols in each of any displayed empty symbol positions, and (iii) repeat (b) to (ef); and (g) if no empty symbol position is displayed, display and provide an award based on at least one of any generated winning symbol combinations for said play of the game.

11. The gaming system of claim 10, wherein the at least one designated symbol is a wild symbol.

12. The gaming system of claim 10, wherein the indicated numeric quantity associated with the at least one generated designated symbol is based on one selected from the group consisting of: a random determination and a predefined quantity.

13. The gaming system of claim 10, wherein the instructions cause the at least one processor to change the indicated numeric quantity associated with at least one of any generated designated symbols by decrementing the indicated numeric quantity.

14. The gaming system of claim 13, wherein the instructions cause the at least one processor to change the indicated numeric quantity associated with at least one of any generated designated symbols by decrementing the indicated numeric quantity by a predefined quantity.

15. The gaming system of claim 10, wherein the instructions cause the at least one processor to change the indicated numeric quantity associated with each of any generated designated symbols which is part of at least one winning symbol combination.

16. The gaming system of claim 15, wherein the instructions cause the at least one processor to change the indicated numeric quantity associated with each of any generated designated symbols based on a quantity of winning symbol combinations of which said designated symbol is a part.

17. The gaming system of claim 10, wherein, for said play of the game, said award is based, at least in part, on at least one of: a quantity of generated designated symbols, the indicated numeric quantity associated with at least one of any generated designated symbols, a quantity of generated winning symbol combinations, and a quantity of symbols included in at least one winning symbol combination.

18. The gaming system of claim 10, wherein the predefined indicated numeric quantity is zero.

19. The gaming system of claim 10, wherein for at least one of any repeats of (b) to (e), the probability of generating the designated symbol in one of the displayed empty symbol positions changes.

20. A method of operating a gaming system, said method comprising:

(a) causing at least one processor to execute a plurality of instructions to generate one of a plurality of symbols in each of a plurality of symbol positions, said plurality of symbols including:

(i) at least one active designated symbol, said at least one active designated symbol being associated with an initial indicated numeric quantity of generations said symbol will remain active, said initial indicated numeric quantity being greater than one, and (ii) at least one non-designated symbol, said at least one non-designated symbol not being associated with any indicated numeric quantity;

(b) causing at least one display device to display the generated symbols in the symbol positions;

(c) causing the at least one processor to execute the plurality of instructions to determine whether any winning symbol combinations are generated and displayed;

(d) for each generated symbol, causing the at least one processor to execute the plurality of instructions to determine said generated symbol as one of: any designated symbols and any non-designated symbols;

(e) for each of any generated winning symbol combinations:

(i) causing the at least one display device display an award based on said generated winning symbol combination, and (ii) causing the at least one processor to execute the plurality of instructions to remove at least one of any determined non-designated symbols of said generated winning symbol combination, each of said removed, non-designated symbols resulting in a displayed empty symbol position;

(f) for at least one of any determined generated designated symbols:

(i) causing the at least one processor to execute the plurality of instructions to modify the indicated numeric quantity associated with said generated designated symbol, (ii) causing the at least one processor to execute the plurality of instructions to determine whether said designated symbol is inactive, said determination being based, at least in part, on the modified indicated numeric quantity associated with said designated symbol, (iii) if said designated symbol is determined to be inactive, causing the at least one processor to execute the plurality of instructions to remove said inactive designated symbol, said removal resulting in a displayed empty symbol position, and (iv) if said designated symbol is determined to be active, causing the at least one display device to continue to display said active designated symbol; and (g) if any empty symbol position is displayed:

(i) causing the at least one processor to execute the plurality of instructions to reposition zero, one, or more of said generated symbols to zero, one, or more of the empty symbol positions to create zero, one, or more empty symbol positions, (ii) causing the at least one processor to execute the plurality of instructions to generate one of the plurality of symbols in each of any displayed empty symbol positions, (iii) causing the at least one display device to display the generated symbols in each of any displayed empty symbol positions, and (iv) repeating (c) to (g).

21. The method of claim 20, wherein the at least one designated symbol is a wild symbol.

22. The method of claim 20, which includes causing the at least one processor to execute the plurality of instructions to determine the indicated numeric quantity associated with the at least one generated designated symbol based on one selected from the group consisting of: a random determination and a predefined quantity.

23. The method of claim 20, which includes causing the at least one processor to execute the plurality of instructions to change the indicated numeric quantity associated with at least one of any generated designated symbols by decrementing the indicated numeric quantity.

24. The method of claim 23, which includes causing the at least one processor to execute the plurality of instructions to change the indicated numeric quantity associated with at least one of any generated designated symbols by decrementing the indicated numeric quantity by a predefined quantity.

25. The method of claim 20, which includes causing the at least one processor to execute the plurality of instructions to change the indicated numeric quantity associated with each of any generated designated symbols which is part of at least one winning symbol combination.

26. The method of claim 25, which includes causing the at least one processor to execute the plurality of instructions to change the indicated numeric quantity associated with each of any generated designated symbols based on a quantity of winning symbol combinations of which said designated symbol is a part.

27. The method of claim 20, which includes causing the at least one processor to execute the plurality of instructions to determine whether at least one of any generated designated symbols is active based on whether the indicated numeric quantity exceeds a predefined indicated numeric quantity.

28. The method of claim 27, wherein the predefined indicated numeric quantity is zero.

29. The method of claim 20, which is operated through a data network.

30. The method of claim 29, wherein said data network is an internet.

31. A method of operating a gaming system, said method comprising:

(a) causing at least one processor to execute a plurality of instructions to generate one of a plurality of symbols in each of a plurality of symbol positions, said plurality of symbols including:
 (i) at least one designated symbol, said at least one designated symbol being associated with an initial indicated numeric quantity of generations said symbol will continue to be displayed if initially generated, said initial indicated numeric quantity being greater than one, and
 (ii) at least one non-designated symbol, said at least one non-designated symbol not being associated with any indicated numeric quantity;
(b) causing at least one display device to display the generated symbols in the symbol positions;
(c) causing the at least one processor to execute the plurality of instructions to determine whether any winning symbol combinations are generated and displayed;
(d) for each generated symbol, causing the at least one processor to execute the plurality of instructions to determine said generated symbol as one of: any designated symbols and any non-designated symbols;
(e) causing the at least one processor to execute the plurality of instructions to remove at least one of any determined non-designated symbols included in each of any generated winning symbol combinations, each of any removed non-designated symbols resulting in an empty symbol position;
(f) for at least one of any determined generated designated symbols:
 (i) causing the at least one processor to execute the plurality of instructions to modify the indicated numeric quantity associated with said generated designated symbol,
 (ii) causing the at least one processor to execute the plurality of instructions to remove said designated symbol if the modified indicated numeric quantity associated with said designated symbol is equal to a predefined indicated numeric quantity, said removal resulting in an empty symbol position, and
 (iii) causing the at least one display device to continue to display said designated symbol if the modified indicated numeric quantity associated with said designated symbol exceeds said predefined indicated numeric quantity;
(g) if any empty symbol position is displayed:
 (i) causing the at least one processor to execute the plurality of instructions to reposition zero, one, or more of said generated symbols to zero, one, or more of the empty symbol positions to create zero, one, or more empty symbol positions,
 (ii) causing the at least one processor to execute the plurality of instructions to generate one of the plurality of symbols in each of any displayed empty symbol positions,
 (iii) causing the at least one display device to display the generated symbols in each of any displayed empty symbol positions, and
 (iv) repeating (c) to (fg); and
(h) if no empty symbol position is displayed:
 (i) causing the at least one display device to display an award based on at least one of any generated winning symbol combinations for said play of the game, and
 (ii) providing the displayed award.

32. The method of claim 31, wherein the at least one designated symbol is a wild symbol.

33. The method of claim 31, wherein the indicated numeric quantity associated with the at least one generated designated symbol is based on one of the group consisting of: a random determination and a predefined quantity.

34. The method of claim 31, which includes causing the at least one processor to execute the plurality of instructions to change the indicated numeric quantity associated with at least one of any generated designated symbols by decrementing the indicated numeric quantity.

35. The method of claim 34, which includes causing the at least one processor to execute the plurality of instructions to change the indicated numeric quantity associated with at least one of any generated designated symbols by decrementing the indicated numeric quantity by a predefined quantity.

36. The method of claim 31, which includes causing the at least one processor to execute the plurality of instructions to change the indicated numeric quantity associated with each of any generated designated symbols which is part of at least one winning symbol combination.

37. The method of claim 36, which includes causing the at least one processor to execute the plurality of instructions to change the indicated numeric quantity associated with each of any generated designated symbols based on a quantity of winning symbol combinations of which said designated symbol is a part.

38. The method of claim 31, wherein, for said play of the game, said award is based, at least in part, on at least one of: a quantity of generated designated symbols, the indicated numeric quantity associated with at least one of any generated designated symbols, a quantity of generated winning symbol combinations, and a quantity of symbols included in at least one winning symbol combination.

39. The method of claim 31, wherein the predefined indicated numeric quantity is zero.

40. The method of claim 31, wherein for at least one of any repeats of (c) to (f), the probability of generating the designated symbol in one of the displayed empty symbol positions changes.

41. The method of claim 31, which is operated through a data network.

42. The method of claim 41, wherein said data network is an internet.

* * * * *

UNITED STATES PATENT AND TRADEMARK OFFICE

CERTIFICATE OF CORRECTION

PATENT NO. : 8,790,169 B2
APPLICATION NO. : 12/178429
DATED : July 29, 2014
INVENTOR(S) : Brian F. Saunders It is certified that error appears in the above-identified patent and that said Letters Patent is hereby corrected as shown below:

IN THE CLAIMS

In Claim 1, Column 39, Line 67, replace “(ef)” with --(f)--.
In Claim 10, Column 41, Line 12, replace “a” with --the--.
In Claim 10, Column 41, Line 23, replace “(ef)” with --(f)--.
In Claim 19, Column 41, Line 65, replace “(e)” with --(f)--.
In Claim 19, Column 41, Line 65, replace the first instance of “the” with --a--.
In Claim 20, Column 42, Line 25, between “device” and the second instance of “display” insert --to--.
In Claim 31, Column 44, Line 35, replace “(fg)” with --(g)--.
In Claim 31, Column 44, Line 39, delete “for said play of the game”.
In Claim 33, Column 44, Line 45, replace the first instance of “of” with --selected from--.
In Claim 40, Column 45, Line 11, replace “(f)” with --(g)--.
In Claim 40, Column 45, Line 11, replace the first instance of “the” with --a--.

Signed and Sealed this
Third Day of November, 2015

Michelle K. Lee
*Director of the United States Patent and Trademark Office*